US012048609B2

United States Patent
Lai

(10) Patent No.: US 12,048,609 B2
(45) Date of Patent: Jul. 30, 2024

(54) SELF-LIGATING ORTHODONTIC BRACKET

(71) Applicant: Solventum Intellectual Properties Company, Maplewood, MN (US)

(72) Inventor: Ming-Lai Lai, Afton, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 0 days.

(21) Appl. No.: 18/097,308

(22) Filed: Jan. 16, 2023

(65) Prior Publication Data

US 2023/0200948 A1 Jun. 29, 2023

Related U.S. Application Data

(62) Division of application No. 16/311,062, filed as application No. PCT/US2017/037112 on Jun. 13, 2017, now Pat. No. 11,553,991.

(60) Provisional application No. 62/357,235, filed on Jun. 30, 2016.

(51) Int. Cl.
*A61C 7/28* (2006.01)
*A61C 7/14* (2006.01)
*A61C 7/16* (2006.01)

(52) U.S. Cl.
CPC ............... *A61C 7/287* (2013.01); *A61C 7/14* (2013.01); *A61C 7/16* (2013.01)

(58) Field of Classification Search
CPC .. A61C 7/287; A61C 7/14; A61C 7/16; A61C 7/28; A61C 7/12; A61C 7/00
USPC .......................................................... 433/10
See application file for complete search history.

(56) References Cited

U.S. PATENT DOCUMENTS

| | | | |
|---|---|---|---|
| 4,536,154 A | 8/1985 | Garton, Jr. et al. |
| 4,978,007 A | 12/1990 | Jacobs et al. |
| 5,015,180 A | 5/1991 | Randklev |
| 5,078,596 A | 1/1992 | Carberry et al. |
| 5,254,002 A | 10/1993 | Reher et al. |
| 5,322,435 A | 6/1994 | Pletcher |
| 5,366,372 A | 11/1994 | Hansen et al. |
| 5,429,229 A | 7/1995 | Chester et al. |
| 6,183,249 B1 | 2/2001 | Brennan et al. |

(Continued)

FOREIGN PATENT DOCUMENTS

CN 201617965 U 11/2010
EP 1977717 A1 10/2008

(Continued)

OTHER PUBLICATIONS

Andrews, "The Six Keys to Optimal Occlusion", Straight Wire, The Concept and Appliance, 1989, pp. 13-24.

(Continued)

*Primary Examiner* — Ralph A Lewis
*Assistant Examiner* — Mirayda A Aponte
(74) *Attorney, Agent, or Firm* — Kevin Weber

(57) ABSTRACT

The present disclosure provides high strength, self-ligating appliances with orthodontically desirable dimensions. The appliances of the present disclosure incorporate a door slidably engaged to a channel in the body; one that can be opened or closed depending on the equilibrium position of an integral protrusion on the door. Cooperating grooves and rails on the body and the door can guide the door between the open and closed positions, and mitigate against unintentional detachment.

18 Claims, 11 Drawing Sheets

(56) References Cited

U.S. PATENT DOCUMENTS

| | | |
|---|---|---|
| 6,648,638 B2 | 11/2003 | Castro et al. |
| 7,137,812 B2 | 11/2006 | Cleary et al. |
| 7,335,020 B2 | 2/2008 | Castner et al. |
| 7,621,743 B2 | 11/2009 | Bathen et al. |
| 7,785,101 B2 | 8/2010 | Förster |
| 7,909,603 B2 | 3/2011 | Oda |
| 8,469,704 B2 | 6/2013 | Oda et al. |
| 8,636,508 B2 | 1/2014 | Förster |
| 8,726,510 B2 | 5/2014 | Voudouris |
| 2005/0239012 A1 | 10/2005 | Bathen et al. |
| 2008/0286710 A1 | 11/2008 | Cinader, Jr. et al. |
| 2009/0233252 A1 | 9/2009 | Cinader, Jr. |
| 2009/0298003 A1 | 12/2009 | Wei et al. |
| 2011/0086323 A1 | 4/2011 | Wessinger |
| 2014/0038120 A1 | 2/2014 | Lin et al. |
| 2014/0127638 A1 | 5/2014 | Huang |
| 2014/0141383 A1 | 5/2014 | Hagelganz et al. |
| 2014/0141384 A1 | 5/2014 | Hagelganz et al. |
| 2014/0199648 A1 | 7/2014 | Lopes |
| 2014/0255865 A1 | 9/2014 | Gautam |
| 2014/0272750 A1 | 9/2014 | Lai |
| 2014/0272752 A1 | 9/2014 | Huang |
| 2014/0272753 A1 | 9/2014 | Sommer et al. |
| 2014/0272754 A1 | 9/2014 | Curley |
| 2014/0295369 A1 | 10/2014 | Nóbrega |
| 2015/0017595 A1 | 1/2015 | Förster et al. |
| 2015/0017596 A1 | 1/2015 | Wong et al. |
| 2015/0017597 A1 | 1/2015 | Solano Reina et al. |
| 2015/0050612 A1 | 2/2015 | Damon et al. |
| 2015/0086936 A1 | 3/2015 | Owen |
| 2015/0125804 A1 | 5/2015 | D'Amico Neto |
| 2015/0223913 A1* | 8/2015 | Yick ...................... A61C 7/287 433/10 |
| 2015/0223914 A1 | 8/2015 | Sabilla et al. |
| 2016/0095673 A1 | 4/2016 | Damon |
| 2016/0095675 A1 | 4/2016 | Damon |
| 2016/0135929 A1 | 5/2016 | Sommer et al. |

FOREIGN PATENT DOCUMENTS

| | | |
|---|---|---|
| EP | 2823786 A1 | 1/2015 |
| EP | 2870944 A1 | 5/2015 |
| EP | 3034030 A1 | 6/2016 |
| EP | 2783656 B1 | 6/2017 |
| EP | 2742902 B1 | 9/2017 |
| EP | 2891468 B1 | 2/2018 |
| EP | 2630932 B1 | 4/2018 |
| EP | 2730250 81 | 4/2018 |
| EP | 2777599 B1 | 1/2019 |
| WO | 1996000533 A1 | 1/1996 |
| WO | 2010063485 A1 | 6/2010 |
| WO | 2013055529 A1 | 4/2013 |
| WO | 2014018095 A1 | 1/2014 |
| WO | 2014078564 A1 | 5/2014 |
| WO | 2014144145 A1 | 9/2014 |
| WO | 2014164779 A1 | 10/2014 |
| WO | 2015026400 A2 | 2/2015 |
| WO | 2015032918 A1 | 3/2015 |
| WO | 2015042481 A1 | 3/2015 |

OTHER PUBLICATIONS

International Search Report for PCT International Application No. PCT/US2017/037112, mailed on Sep. 12, 2017, 4 pages.

* cited by examiner

SELF-LIGATING ORTHODONTIC BRACKET

CROSS-REFERENCE TO RELATED APPLICATIONS

This application is a divisional of U.S. application Ser. No. 16/311,062, filed Dec. 18, 2018, now allowed, which is a 371 of International Application No. PCT/US2017/037112, filed Jun. 13, 2017, which claims benefit of provisional Application No. 62/357,235, filed Jun. 30, 2016.

BACKGROUND

Orthodontics is a field of dentistry associated with the professional supervision, guidance and correction of mal-positioned teeth. The benefits of orthodontic treatment include attaining and maintaining a proper bite function, enhancing facial aesthetics, and improving dental hygiene. To achieve these goals, the orthodontic professional often makes use of corrective appliances that engage to the patient's teeth and apply gentle therapeutic forces to move the teeth toward proper positions.

One common type of treatment uses tiny slotted appliances called orthodontic brackets, which are adhesively attached to either the front or back surfaces of the teeth. To begin treatment, a resilient arch-shape wire ("archwire") is received into the slot of each bracket. The ends of the archwire are generally captured in appliances called molar tubes, which are affixed to the patient's molar teeth. As the archwire slowly returns to its original shape, it acts as a track that guides the movement of teeth toward desired positions. The brackets, tubes, and archwire are collectively known as "braces."

The procedure used to engage and activate the archwire on the orthodontic bracket is known as ligation. Traditional brackets are ligated to the archwire with the help of one or more pairs of opposing tiewings, or cleat-like projections on the bracket body. The archwire is placed in the archwire slot and generally a tiny elastomeric "O"-ring ligature, or alternatively metal ligature wire, is tightened over the archwire and under the undercut portions of tiewings located on opposite sides of the archwire slot. The ligature thus secures the archwire within the archwire slot of each bracket and provides a precise mechanical coupling between these bodies.

Ligatures have numerous drawbacks. For example, elastomeric ligatures have a tendency to lose their elasticity over time, resulting in inconsistent archwire sliding mechanics. While these ligatures can be made translucent for aesthetic treatment, they also tend to easily stain. Ligation using a ligature wire, on the other hand, can be quite cumbersome and time-consuming Being made of metal, ligature wire is also generally considered non-aesthetic.

Self-ligating brackets present a solution to the above problems. These appliances generally use a clip, spring member, door, shutter, bail, or other ligation mechanism built into the bracket itself to retain the archwire in the slot, thereby obviating use of a separate ligature. Several advantages can derive from the use of self-ligating brackets. For example, these appliances can decrease friction between the archwire and the bracket compared with brackets ligated with elastomeric ligatures, potentially providing faster leveling and aligning of teeth in early stages of treatment. Depending on the ligation mechanism, these appliances can also simplify the installation and removal of an archwire, significantly reducing chair time for the treating professional. Finally, self-ligating brackets can also provide better hygiene than conventional brackets, which use elastomeric ligatures and ligature wires that can trap food and plaque.

SUMMARY

The realization of an aesthetic self-ligating bracket poses a number of technical challenges and tradeoffs. For example, the material used in a clip, spring member, door, bail, or other ligation mechanism is typically metallic, and strongly contrasts with the natural color of teeth. While polymeric materials are aesthetic and can be configured for this function, polymers are generally soft, vulnerable to wear, and stain easily during the course of treatment. Finally, ceramic materials have long been known to provide reasonable strength, resistance to staining, and excellent aesthetics. However, these materials are also brittle, can be difficult to machine and assemble, and do not have the resiliency needed for most ligation mechanisms.

While self-ligating latch designs exist for ceramic brackets that ameliorate some or all of the above issues, the facial-lingual profile of such appliances tends to be excessive to accommodate for the lack of resiliency. Furthermore, such designs may require comparatively thin regions of the body to accommodate a door or other sliding latch mechanism, which leads to stress concentration and potential appliance failure. Moreover, such designs are unable to easily accommodate certain prescriptive dimensions, such as precise archwire slot depth and distance between the bottom wall of the slot and the base. Accordingly, there exist a need in the art for low-profile, self-ligating bracket with high strength and archwire control.

The present disclosure provides high strength, self-ligating appliances with orthodontically desirable dimensions. The appliances of the present disclosure incorporate a door slidably engaged to a channel in the body; one that can be opened or closed depending on the equilibrium position of an integral protrusion. Cooperating grooves and rails on either or both the body and the door can guide the door between the open and closed positions, and mitigate against unintentional detachment. In an exemplary embodiment, these appliances also use a retention member located in the channel in concert with the door protrusion. The retention member, optionally in combination with one or more side walls of the channel, provides a plurality of regions for accommodating the protrusion. Based on the engagement between the protrusion and the retention member, these appliances can provide discrete, pre-defined opened and closed door positions, thereby facilitating archwire ligation for the treating professional.

Moreover, the appliances feature a reduced facial-lingual profile and still maintain the desired facial-lingual height between the bottom of the archwire slot and the base, as well as the prescribed archwire slot height. This advantageous feature can be realized, for example, by cooperating rails and grooves in combination with archwire contacting surfaces of the door that are closer to the bottom wall on the mesial and distal edges of the archwire slot than at the center. This configuration increases the strength of both the door and the body, and results in an increased level of labial pull force that the assembled bracket can withstand.

In one aspect, the present disclosure provides an orthodontic appliance comprising
  a base having a bonding surface,
  a body extending outwardly from the base, the body including an mesial-distally extending arch wire slot having a bottom wall, a door slidably coupled to the body, the door moveable between an open state in which an archwire can be ligated in the archwire slot and a closed state in which an archwire can be retained in the archwire slot, wherein the door has a lingual surface including coplanar mesial and distal surfaces, and wherein the bottom wall forms an acute angle with the mesial and distal surfaces, and wherein the lingual surface includes a leading edge region that includes planar contacting surfaces that are substantially parallel to the bottom wall.

In another aspect, the present disclosure provides an orthodontic appliance comprising:

a base having a bonding surface, a body extending outwardly from the base, the body including an mesial-distally extending arch wire slot having a bottom wall and a channel in the body oriented generally perpendicular to the slot, a door slidably coupled to the body, the door moveable between an open state in which an archwire can be ligated in the archwire slot and a closed state in which an archwire can be retained in the archwire slot, wherein the lingual surface of the door includes a leading edge region having a contact surface substantially parallel to the bottom wall in the closed state and a strut extending from a mesial-distal center of the lingual surface that is slidably received in the channel In another aspect, the present disclosure provides a method of ligating an archwire, the method comprising:

providing an appliance with a base having a bonding surface, a body extending outwardly from the base, the body including an mesial-distally extending arch wire slot having a bottom wall, and a door slidably coupled to a channel in the body, the door moveable between an open state in which an archwire can be ligated in the archwire slot and a closed state in which an archwire can be retained in the archwire slot; and sliding the door in the direction of the archwire slot, wherein sliding the door in the direction of the archwire slot deflects a latch extending across the channel in a lingual direction.

DIRECTIONAL DEFINITIONS

As used herein:

"Mesial" means in a direction toward the center of the patient's curved dental arch.

"Distal" means in a direction away from the center of the patient's curved dental arch.

"Occlusal" means in a direction toward the outer tips of the patient's teeth.

"Gingival" means in a direction toward the patient's gums or gingiva.

"Facial" means in a direction toward the patient's lips or cheeks.

"Lingual" means in a direction toward the patient's tongue.

DETAILED DESCRIPTION

The sections below describe illustrative embodiments directed to self-ligating orthodontic appliances and methods related thereto. These embodiments are exemplary and accordingly should not be construed to unduly limit the invention. For example, it is to be understood that one of ordinary skill can adapt the disclosed appliances and methods for attachment to either the labial or lingual surfaces of teeth, to different teeth within the same dental arch (for example, corresponding appliances on mesial and distal halves of the dental arch), or to teeth located on either the upper or lower dental arches.

The appliances and methods described herein may optionally be customized to the individual patient undergoing treatment. Material and dimensional specifications could also vary from those disclosed herein without departing from the scope of the claimed invention. Unless otherwise specified, the provided appliances and components could be constructed of any of a variety of metal, ceramic, polymeric, and composite materials known to those skilled in the art. Further, unless otherwise indicated, dimensions associated with the appliances and their components are not critical and the accompanying drawings are not necessarily drawn to scale.

Figure 1:
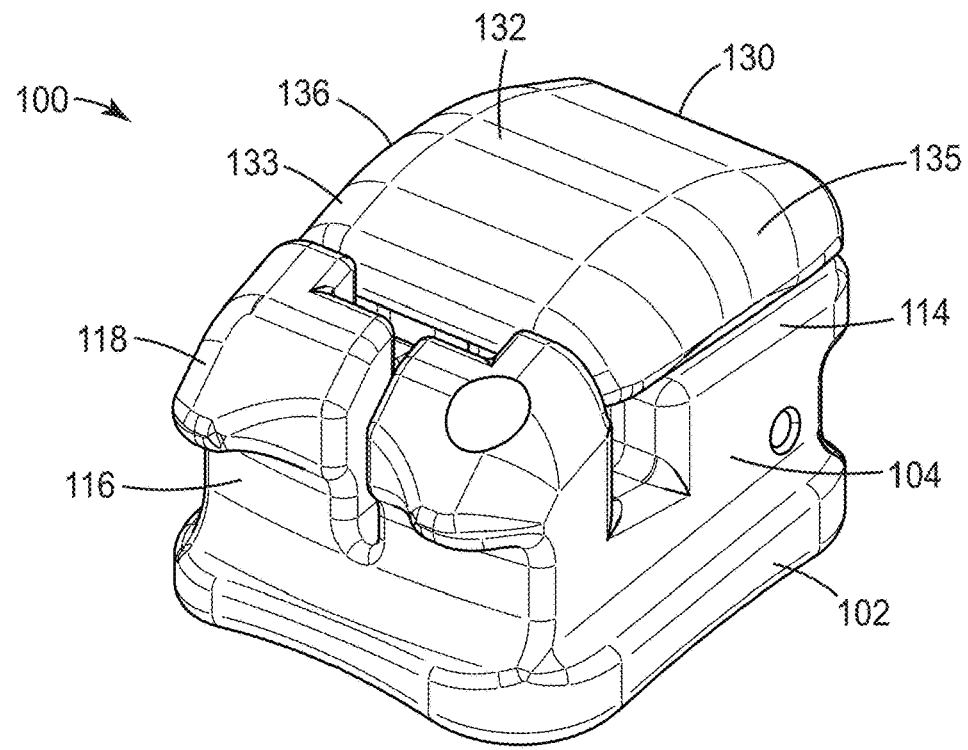
FIG. 1 is a perspective view of an orthodontic appliance according to one embodiment, looking toward its facial, gingival, and mesial sides.
Figure 2:
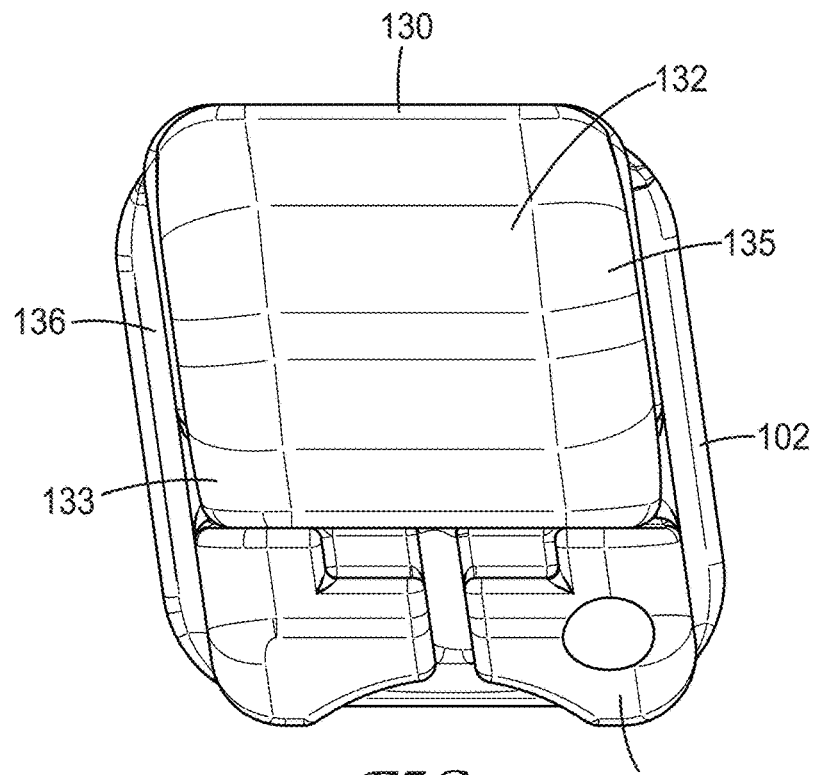
FIG. 2 is a plan view of the appliance of FIG. 1, looking toward its facial side.

An orthodontic appliance according to one embodiment, designated by the numeral 100, is shown in FIGS. 1 and 2 in assembled form. The appliance 100 has a base 102 and a body 104 extending outwardly from the base 102. The bottom of the base 102 has a bonding surface 106 having a concave three-dimensional surface contour generally approximating that of a respective tooth to which the appliance 100 is to be bonded. In certain embodiments, the bonding surface 106 may feature a compound contour, with curvature in both the mesial-distal and occlusal-gingival direction.

The bonding surface 106 can optionally include mesh, holes, bumps, recesses, undercuts, a microetched surface, glass grit, bonded particles, an organo-silane treated surface, or any other known mechanical or chemical modification to enhance adhesive bonding between the base 102 and the underlying tooth. Alternatively, the base 102 could also have a banded configuration in which the base 102 fully encircles the tooth. In other implementations, the base 102 may include a fixed, compressible material to assist in filling gaps between the base 102 and the tooth structure. Suitable compressible materials are described in US Publication No. 2009/0233252 (Cinader).

The orthodontic appliance 100 of this embodiment and the orthodontic appliances of other embodiments, unless otherwise indicated, are described herein using a reference frame attached to a labial surface of a tooth on the upper or lower jaw. Consequently, terms such as labial, lingual, mesial, distal, occlusal, and gingival used to describe the orthodontic appliance 100 are relative to the chosen reference frame. The embodiments, however, are not limited to the chosen reference frame and descriptive terms, as the orthodontic appliance 100 may be used on other teeth and in other orientations within the oral cavity. For example, the orthodontic appliance 100 may also be coupled to the lingual surface of the tooth. Those of ordinary skill in the art will recognize that the descriptive terms used herein may not directly apply when there is a change in reference frame. Nevertheless, the embodiments are intended to be independent of location and orientation within the oral cavity and the relative terms used to describe embodiments of the orthodontic bracket are to merely provide a clear description of the embodiments in the drawings.

Figure 3:
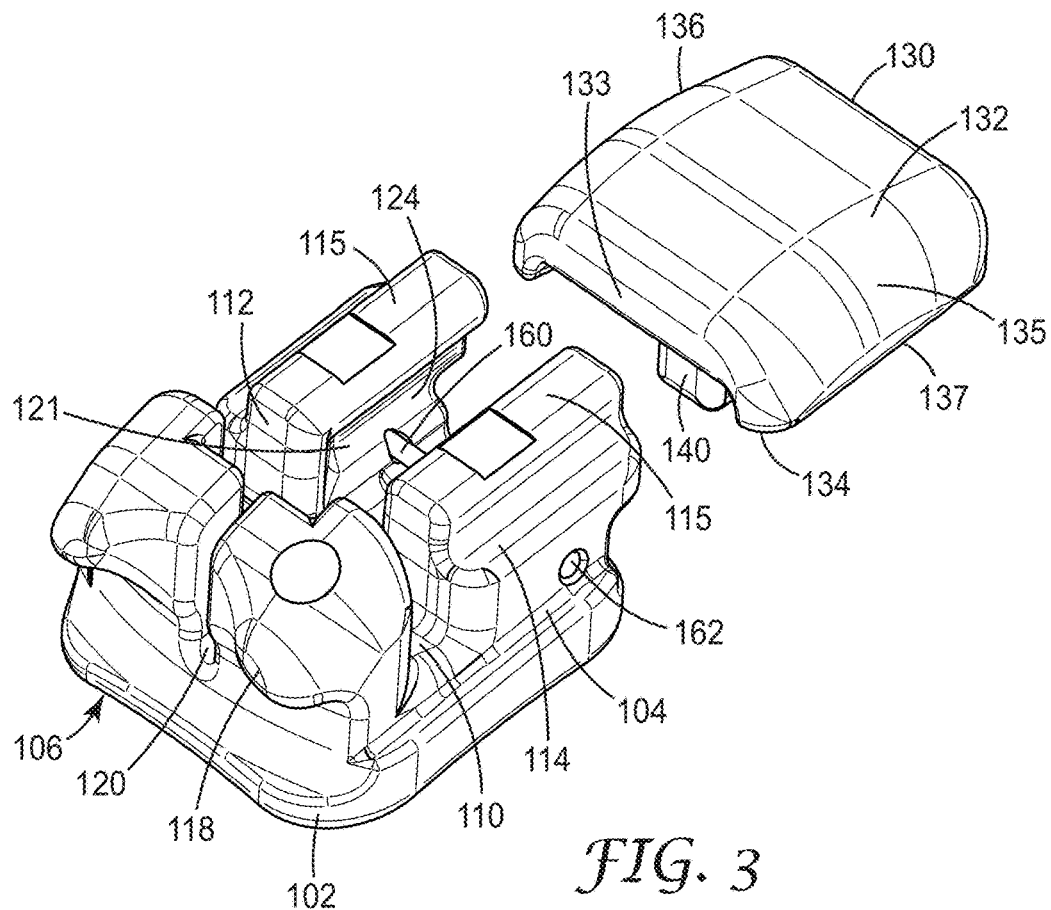
FIG. 3 is an exploded, perspective view of the appliance of FIGS. 1-2, looking toward its gingival, facial, and mesial sides.

An archwire slot 108, having a generally rectilinear configuration, extends in a generally mesial-distal direction across a generally facial-facing surface of the body 104. Referring particularly to the mesial view in FIG. 4, the archwire slot 108 includes a bottom, lingual wall 110 along with gingival and occlusal side walls 111, 112. The occlusal wall 111 is at least partially defined by surfaces of door support sections 114 on the occlusal side of body 104 (See FIGS. 3 and 8). An archwire (not shown) is received in the archwire slot 108 and typically has a generally rectangular cross-section that substantially corresponds with walls 110, 111, 112 of the archwire slot 108. A close correspondence between the dimensions of the archwire and the archwire slot 108 can provide for a precise coupling between the archwire and appliance 100, giving the treating practitioner a high degree of control over the movement of teeth. It should be appreciated, however, that other archwire geometries can be used that do not closely approximate the dimensions of the slot walls.

The appliance 100 may be pre-adjusted for torque and angulation. Tooth angulation can be defined according to the teachings of Dr. Lawrence F. Andrews as the mesiodistal cant of the facial axis of the clinical crown ("FACC") relative to a line perpendicular to the occlusal plane (see, e.g., Straight Wire, The Concept and Appliance, by Lawrence F. Andrews, (L. A. Wells Co., (C)1989)). Bracket angulation may be defined as the particular angular orientation of the archwire slot of the bracket relative to the base of the bracket in order to provide tooth angulation. Tooth torque may be defined as the buccolabial-lingual cant of the FACC when measured from a line perpendicular to the occlusal plane. Consequently, bracket torque may be defined as the orientation of the archwire slot relative to the base of the bracket such that the desired tooth torque is attained. Bracket torque is typically provided via a specified angle of the archwire slot or passage, i.e., "torque in the slot", or an angle is formed in the tooth mounting surface of a bracket, i.e., "torque in the base". Under either configuration, the appliance 100 can be provided with a certain torque that is designated by the letter "T" in FIG. 4. The torque, or angle T, is equivalent to the angle between a reference plane 175 containing the bottom wall 110 of the archwire slot 108 and a reference line 177. The reference line 177 extends in an occlusal-gingival direction and tangent to the base 104 at a point that is located in a lingual direction beneath the mesial-distal center and occlusal-gingival center of the archwire slot 108. Reference line 177 accordingly lies within a torque plane of the appliance 100.

Figure 4:
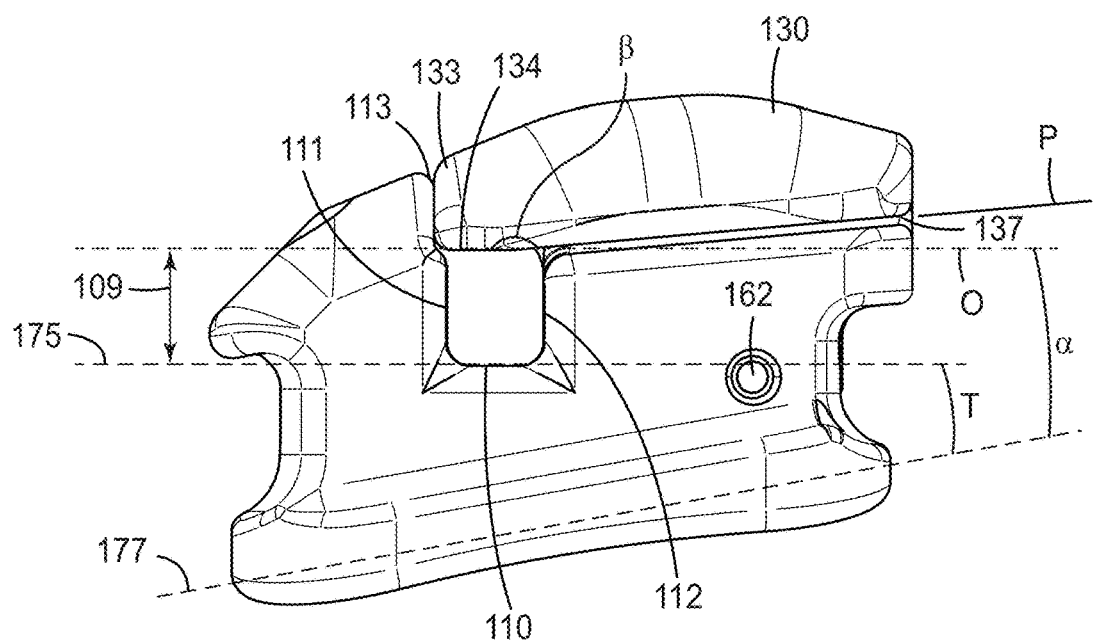
FIG. 4 is a side view of the appliance of FIGS. 1-3, looking toward its mesial side.
Figure 5:
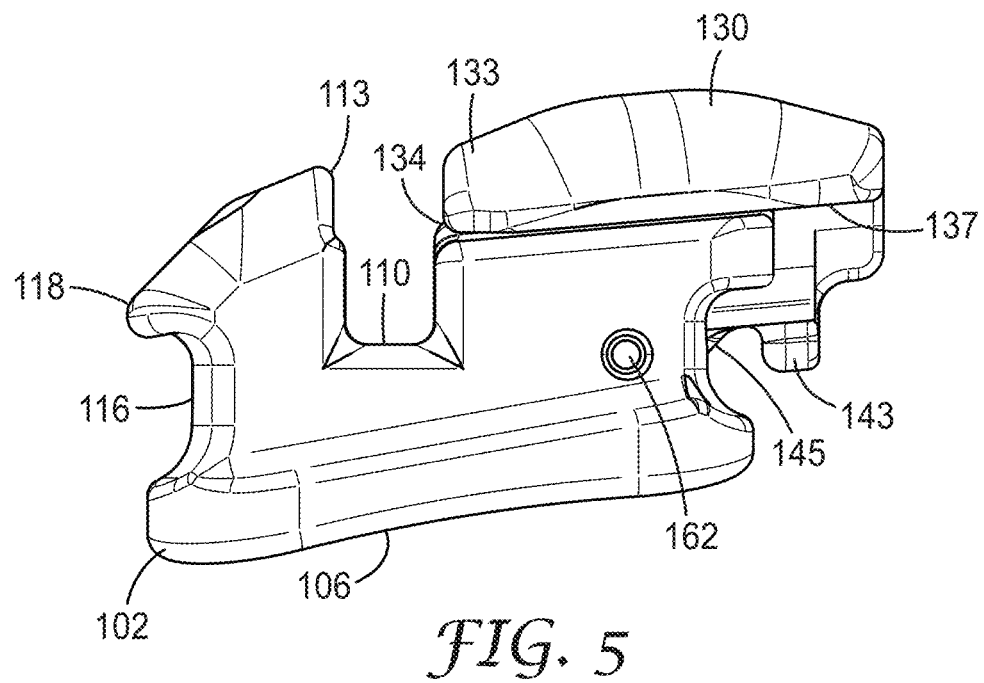
FIG. 5 is a side view of the appliance of FIGS. 1-4, looking toward its mesial side.

A door 130, slidably received in the body 104, controls access to the archwire slot 108 and is shown in its closed position in FIGS. 1-2 and 4. A portion of the door 130 extends across a central portion of the archwire slot 108, thereby preventing ingress or egress of an archwire (not shown here) with respect to the slot 108 of the appliance 100. In the configuration shown in FIG. 1, the archwire would be securely ligated to the appliance 100 such that the archwire will not become accidently dislodged as a result of normal chewing and brushing activity that occurs in a patient's mouth. The door 130 is capable of sliding in both occlusal and gingival directions to toggle between an open position allowing access to the archwire slot 108 (depicted in FIGS. 3 and 5) and the closed position. The archwire can, and typically should, be capable of sliding along the length of the archwire slot 108, thereby allowing the archwire to function as a track that guides the movement of maloccluded teeth. Such sliding is especially prominent as the teeth unravel during the leveling and aligning stages of treatment.

Under most circumstances, the door 130 is adequate on its own to ligate an archwire to the appliance 100. If desired, however, a treating professional can elect to manually ligate the archwire with the assistance of the undercuts 116 and tiewings 118 located on the body 104. Ligation can be achieved, for example, by securing an elastomeric o-ring or ligature wire beneath the undercuts 116, over an archwire received in the slot 108, and beneath the tiewings 118. The undercuts 116 and tiewings 118 may also be used to secure a power chain to two or more teeth if so desired.

Figure 7:
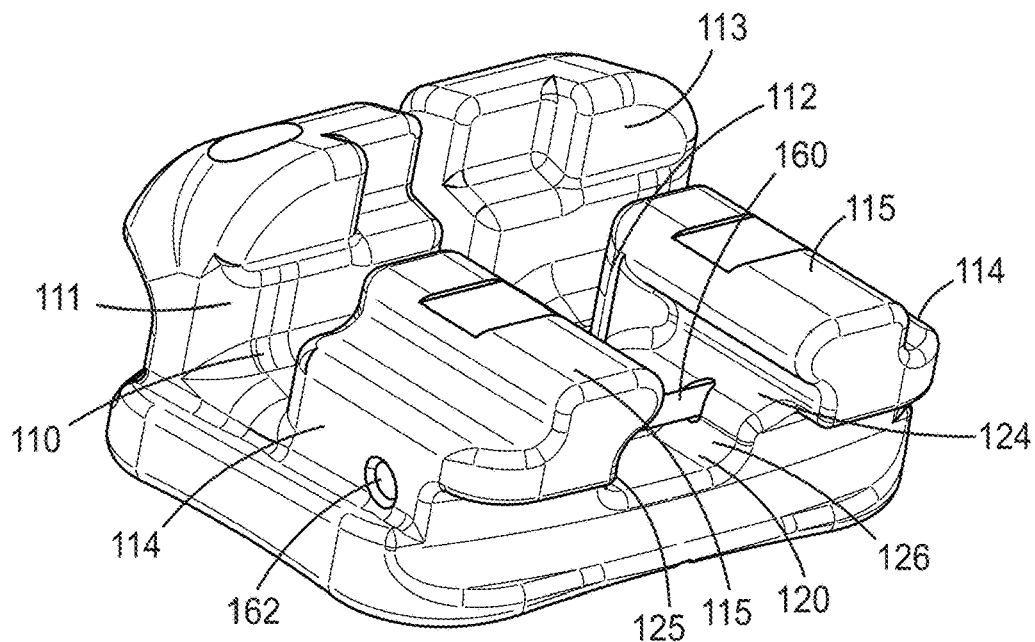
FIG. 7 is a perspective view of the appliance of FIGS. 1-5 with the door removed to expose hidden features of the appliance.
Figure 8:
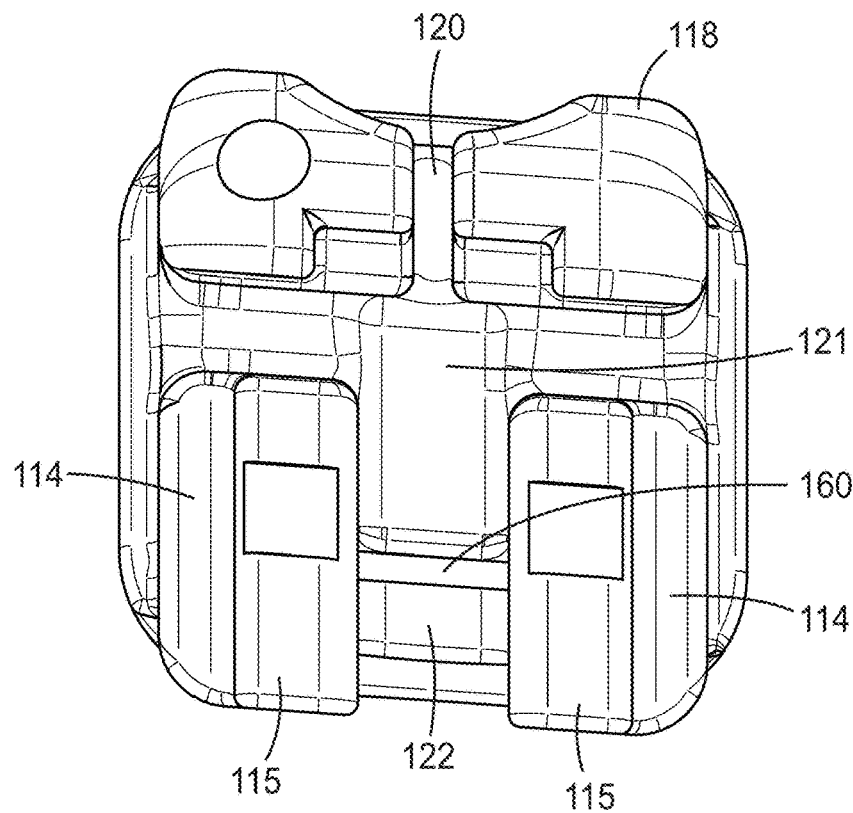
FIG. 8 is a plan view of the appliance of FIG. 7, looking towards its facial side.

Turning to FIGS. 7 and 8, in this and other embodiments described below, the body 104 has a pair of guiderails 115 on the occlusal portion of the facial surface of the body 104. Each guiderail 115 extends along a generally occlusal-gingival direction on one of the mesial and distal sides of a channel 120. The door 130 includes complementary grooves 138, 139 (see FIGS. 9 and 10) that slide along the guiderails 115 as force is applied to the door in a generally occlusal-gingival direction, as further described below. As one skilled in the art can appreciate, there may be appropriate tolerances between the guiderails 115 and the grooves 138,139 to facilitate sliding of the door 130 and avoid binding.

A compound vertical channel 120 extends from the gingival side to the occlusal side of the body 104. The channel 120 runs between the tiewings 118 and rails 115, essentially bifurcating the body 104 into mesial and distal halves. The channel 120, as depicted, may include a narrower mesial-distal thickness on the gingival side of the archwire slot 108. On side of the body 104 occlusal to the archwire slot 108, the channel 120 includes a main channel section 121 and opposing concave recesses 123, 124 extending along a portion of the length to the channel 120. In the depicted embodiment, the concave recesses 123, 124 are formed in door support sections 114 of the body 104 above the bottom wall 122 of the channel 120, leaving wall sections 125 and 126 between each recess and bottom wall 122. Though depicted as concave, the recesses 123, 124 may comprise different cross-sectional shapes (e.g., rectangular, trapezoidal, square, etc.) to accommodate a given door 130 configuration. In presently preferred circumstances, however, the recesses are concave to facilitate sliding of the door 130 between open and closed positions.

The recesses 123, 124 are open to the occlusal end of the channel 120 and are dimensioned to receive complementary rails 141 on the door 130. The open occlusal end of both the channel 120 and the recesses 123, 124 allows the appliance 100 to be assembled by sliding the door 130 in a generally gingival direction into the body 104 and disassembled by sliding the door 130 in a generally occlusal direction. The recesses 123, 124 are open towards their respective gingival ends, in that the recesses 123, 124 at least partially open into the archwire slot 108. In certain implementations, and as depicted, the recesses 123, 124 can be open on both their respective occlusal and gingival ends, with the appliance assembly relying on other means, such as the beam described below, of limiting unwanted sliding of the door 130 relative to the body 104. Alternatively, the recess 123, 124 can be closed toward their respective gingival ends and terminate at wall 112. Closed-ended recesses 123, 124 of this nature can provide a slide-limit (i.e., positive stop surface) to the door, preventing portions of the door 130 from contacting an archwire seated in the archwire slot 108.

In some embodiments, the channel 120 at least partially defines a frangible web located between the bottom wall 122 and the bonding surface 106 and enables the appliance to be conveniently squeeze-debonded by fracturing a frangible web and pivoting the mesial and distal halves of the appliance 100 toward each other. Further options and advantages are described in issued U.S. Pat. No. 5,366,372 (Hansen, et al.).

Various mechanisms can be implemented within the channel 120 to toggle the door 130 between discrete positions—for example, between open and closed positions. Temporary latch mechanisms that provide local equilibrium positions for the door 130 can advantageously prevent the door 130 from spontaneously closing when a treating professional is placing an archwire in the slot 108 or conversely, spontaneously opening during the course of treatment. In the depicted embodiment, the latch is a deflectable beam 160 extending in a mesial-distal direction across a portion of the channel 120, generally perpendicular to the direction of sliding for the door 130. Further examples of mechanism for temporarily arresting the position of the door 130 may be found International Publication No. WO 2014/018095 (Lai et al.)

The deflectable beam 160 is spaced from the occlusal entrance to the channel 120, and is received in a lateral channel 162 that extends through at least one of the mesial and distal door support section 114 of the body 104. In some embodiments, the lateral channel 162 extends through both the mesial and distal door support section 114 thereby splitting the channel into two channel sections (i.e., mesial and distal), but this does not have be the case. The beam 160 can extend through all or a portion of each channel 162 section. In one particularly advantageous implementation, the beam extends through portions of the lateral channel 162 in both mesial and distal door support sections 114. One end of the beam 160 can be fixed in a mesial or distal section of the channel 162 using an adhesive or the like, leaving the other end free in the opposite channel section. This retention structure for the beam 160 prevents inadvertent disassembly during debonding by e.g., fracturing of a frangible web as described in issued U.S. Pat. No. 5,366,372 (Hansen, et al.), as only the fixed end of the beam 160 will typically remain in the channel 162.

In the assembly of the door 130, the beam 160 functions as a latch by resiliently deflecting toward the bottom wall 122 of the channel 120 to permit passage of the door 130 as it is urged in a gingival direction against the beam 160. The beam 160 accordingly acts to prevent inadvertent occlusal-gingival movement of the door, particularly between open and closed positions. Additional aspects of the interaction between the door 130 and the beam 160 are discussed in detail below.

The beam 160 as depicted includes a generally circular cross-section, however other cross-sectional configurations, such as rectangular or ovular, are possible. Additional, suitable beam geometries are, for example, described with respect to FIGS. 20-25 of International Publication No. WO 2014/018095. The beam 160 is preferably made from a resilient metal alloy, such as stainless steel, titanium, cobalt-chromium alloy (such as manufactured by Elgiloy Specialty Metals, Elgin, IL), or a shape-memory alloy such as an alloy of nickel and titanium (e.g., Nitinol). In presently preferred implementations, the beam 160 is sufficiently resilient so that the shape of the beam 160 when relaxed does not significantly change during the course of treatment.

The door 130 includes a lingual surface 131 opposite a facial surface 132. The door has mesial-distal width that substantially matches the overall mesial-distal width of the appliance 100. The door 130 includes a gingival edge region 133 that extends over the archwire slot 108 when the door 130 is in a closed position (See FIGS. 2 and 4). Accordingly, a portion of the lingual surface 131 beneath the edge region 133 will contact the archwire, if such contact is prescribed, when the archwire is received in the archwire slot 108. As can be appreciated by reference again to FIG. 2, the edge region 133 extends the essentially the full mesial-distal length of the archwire slot 108. A portion of the edge region 133 may abut wall surfaces 113 of the body adjacent the gingival wall 111 of the archwire slot 108 when the door is in the close position.

The gingival edge region 133 includes mesial and distal archwire contacting surfaces 134, disposed at mesial and distal ends of the archwire slot 108 when the door is in a closed position. Each contacting surface 134 defines a plane (labeled "O" in FIG. 4) that is at least substantially parallel to the bottom wall 110 of the archwire slot 108 (and plane 175). As used in this context, a contacting surface is substantially parallel to the bottom wall if the deviation from parallel is no greater than 5 degrees. In presently preferred embodiments, the contacting surfaces 134 are parallel to the bottom wall 110, at least within typical manufacturing tolerances (i.e., the angle between the planes defining the relevant surfaces is no greater than 2 degrees). The contacting surfaces 134 are not, however, parallel to glide surfaces 137 of the door 130 that contact portions of the occlusal body 102, as further described below. Furthermore, the plane O defining the contacting surfaces 134 can be oriented at an acute angle relative to the torque plane (e.g., reference line 177). In some embodiments, the angle α formed between the torque plane and the contacting surfaces plane O is at least about 10 degrees, at least about 20 degrees, or at least about 30 degrees. In some embodiments, the angle α formed between the torque plane and the contacting surface plane O is up to about 60 degrees, up to about 50 degrees, or up to about 40 degrees.

The contacting surfaces 134 extend partially into the slot 108 length, and effectively control the facial-lingual slot height 109 at the ends of the slot 108. In the depicted embodiment, the effective slot height 109 is shorter at the mesial and distal ends by virtue of the contacting surfaces 134 than the slot height 109 at regions adjacent the mesial-distal center of the slot 108. By reducing the height 109 at the mesial and distal ends of the slot, the assembled appliance can better express one or both of a given appliance and archwire prescription, without sacrificing the strength of the bracket body 102. Because the door 130 can engage the archwire at two locations that are spaced apart from each other along a mesial-distal direction, it is possible to reduce angular slop in the archwire and achieve greater rotation control than otherwise achievable by engaging the archwire at a single location. Furthermore, the contacting surfaces 134 can provide for more secure ligation by allowing the archwire to impart substantial torque (i.e. twisting forces) to the appliance 100 without undesirably opening the door 130. As can be appreciated by one skilled in the art, the mesial-distal width of edge region 133 of the door 130 may be extended to similarly span the length of an archwire slot.

The edge region 133 may, in certain embodiments, include at least one chamfer or other surface configuration gingival to the contacting surfaces 134 to act as a pushing element for guiding the archwire into the archwire slot 108. Additional attributes and configurations of pushing elements may be found in U.S. Pat. No. 8,469,704 (Oda et al.).

The mesial and distal edges 135, 136 occlusal to the gingival edge region 133 include generally planar glide surfaces 137 that are spaced apart over the width of the door. The width between glide surfaces 137 generally corresponds to distance between the outer edges of rails 115. The glide surfaces 137 are generally offset from the door support surfaces 114 of the body 104 when the door 130 is received in the channel 120, such that the glide surfaces 137 move over, but do not contact, the body 104 when the door 130 is opened and closed. The glide surfaces 137 can, in certain implementations of the present disclosure, reside in a reference plane ("P" in FIG. 4) that is at least substantially parallel to the torque plane of the appliance. Providing glide surfaces that are parallel or substantially parallel to the torque plane helps to prevent or reduce undue rotation or tipping of the appliance 100; ensuring the bracket is seated in the prescribed or otherwise desired location; and further reducing the facial-lingual height of the appliance for enhanced patient comfort.

In the depicted embodiment, the glide surface 137 reference plane P is oriented at an obtuse angle β relative to the bottom wall 110 of the archwire slot 108 and the plane O containing archwire contacting surfaces 134. In some embodiments, the angle β formed between the glide surface plane P and the contacting surfaces plane O is at least about 140 degrees, at least about 150 degrees, or at least about 160 degrees. In some embodiments, the angle β formed between the planes O and P is up to about 175 degrees, up to about 170 degrees, or up to about 165 degrees.

Figure 9:
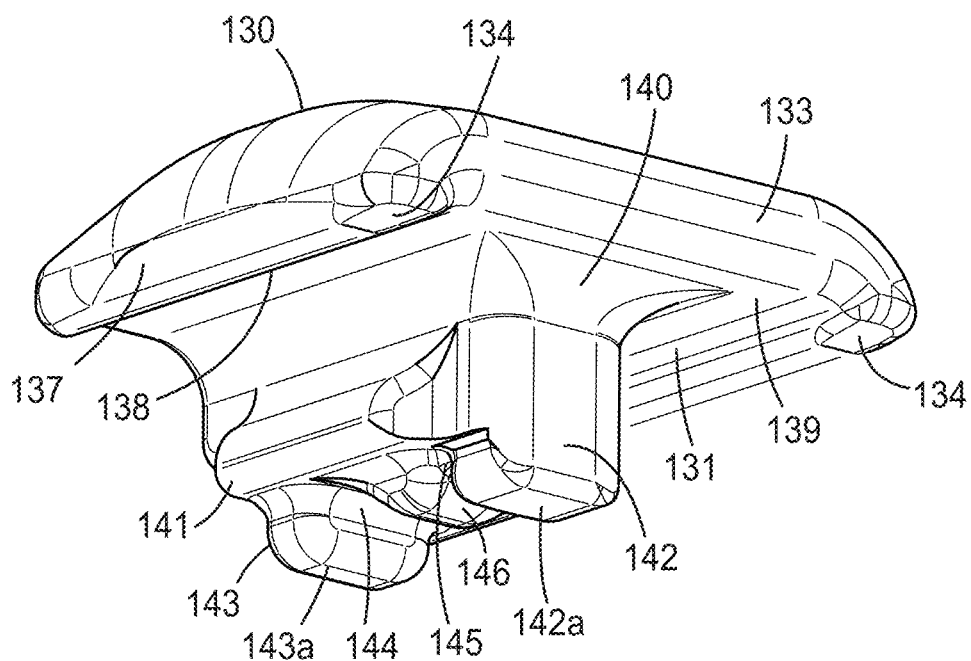
FIG. 9 a perspective view of the door the appliance of FIGS. 1-6, looking toward its occlusal, facial, and mesial sides.
Figure 10:
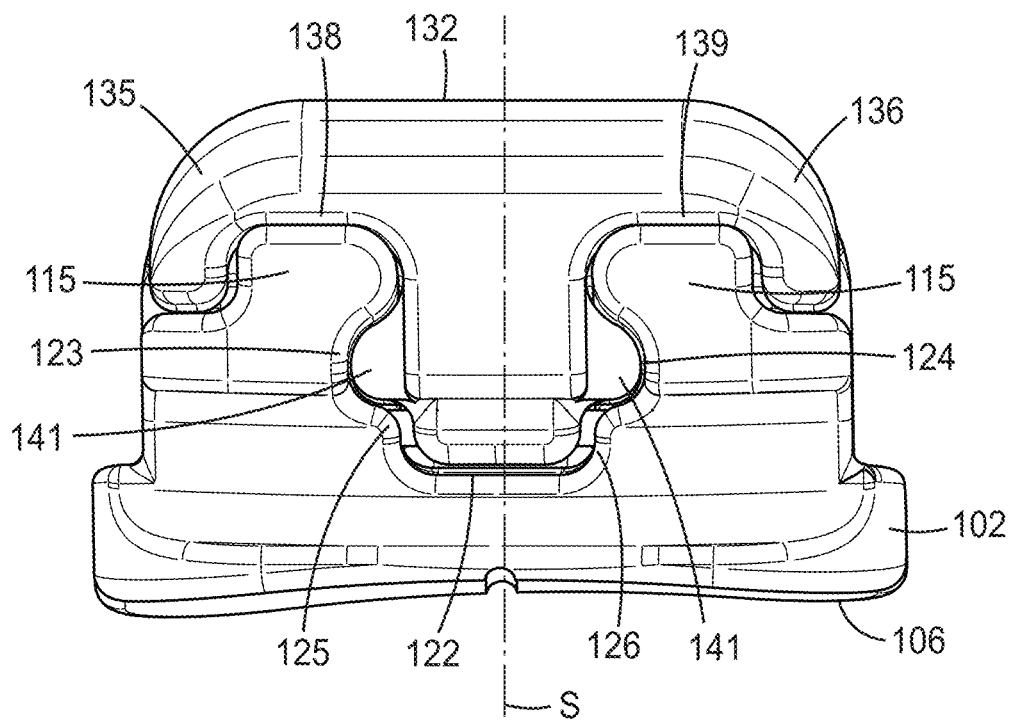
FIG. 10 is a plan view of the appliance of FIG. 1-6, looking towards its occlusal side.

The door 130 further includes a strut 140 and a pair of grooves 138, 139 extending in an occlusal gingival direction on at least a portion of the lingual surface 138. As best depicted in FIGS. 9 and 10, the pair of grooves 138, 139 is formed into the lingual surface 131 of the door, with each groove disposed between a glide surface 137 and the strut 140. The grooves 138, 139 correspond in dimension and relative location to the rails 115 on the facial surface of the body 104. As described above, the grooves 138, 139 slide along the pair of rails 115, and are accordingly open-ended to assist in ease of assembly. Together, the rails 115 and grooves 138, 139 guide the operative sliding motion of the door 130. The grooves 138, 139 can extend the full occlusal-gingival length of the door 130 as depicted, or may terminate adjacent the gingival edge region 133. As described above, the effective slot height 109 will be greater in regions of the archwire slot 108 covered by either groove 138, 139 when the door 130 is in the close position.

The use of grooves 138, 139 in the lingual surface 131 allows for a reduced facial-lingual profile of the door 140, and accordingly appliance 100. By incorporating archwire contacting surfaces 134 that are spaced in a lingual direction from the grooves, the desired archwire slot height 109 can be maintained without sacrificing structural integrity of either the door 140 or the body 104. The structural integrity increases the amount of labial pull forces the door can withstand before a high stress and failure occurs. A higher labial pull force is particularly desirable for self-ligating brackets, which often encounter high forces during bonding, treatment, archwire exchange, and orthodontic treatment.

The enlarged strut 140 extends outwardly from the lingual surface 131 of the door 130. As assembled, the strut 140 is received in the channel 120 between door support sections 114 of the appliance body (See for example FIG. 4). The strut includes a gingival leading edge 142 and an occlusal trailing edge 143, each extending towards the bottom 122 of channel 120. Though a single strut 140 is depicted, alternative appliance configurations may include two struts extending into the channel 120 as assembled. The strut 140 extends in a lingual direction from a mesial-distal center region of the door 140 along an axis S that is generally perpendicular to the glide surface 137 reference plane P, giving the door 130 a generally "T-shaped" appearance when viewed in the mesial direction as in FIGS. 4 and 5 and an "E-shaped" appearance when viewed in the occlusal direction as in FIG. 10. Depending on the desired rotation of the door 130, however, the strut 140 may protrude along an axis S extending at an oblique angle relative to the glide surface 137 reference plane P.

The strut 140 includes a pair of rails 141 that extend along opposite mesial and distal sides, offset from the lingual surface 131. Each rail 141 is dimensioned to be slidingly received in a corresponding mesial and distal recess 123, 124 in channel 120. Though depicted as generally convex, the rails 141 may comprise different cross-sectional shapes (e.g., rectangular, trapezoidal, square, etc.) to accommodate a given recess 123, 124 configuration. Presently preferred implementations feature both mesial and distal rails, however, other appliance configurations according to present disclosure may feature a single rail or no rails. In the preferred implementations, however, the opposing rails 141 add strength to the door structure, and guard against undesired rotation of the door due to facially-directed forces from a seated archwire. This independent interaction between the rail and recess, while not necessarily essential, helps increase tolerance for small gaps that may be present between the door 130 and body 104, and other minor manufacturing irregularities.

Figure 6A:
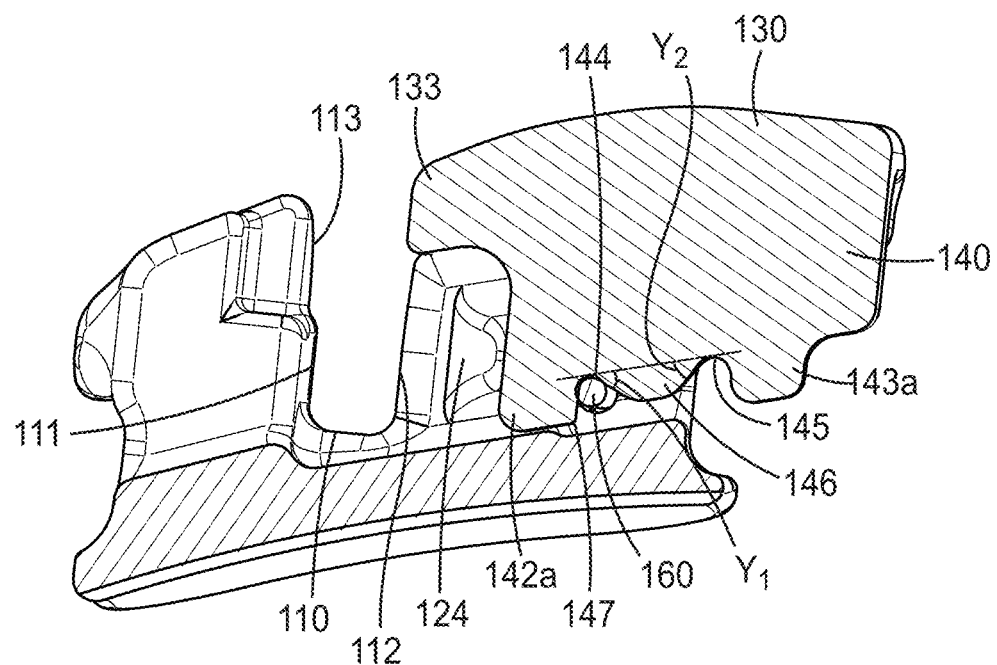
FIG. 6A is a cross-sectional view of the appliance of FIGS. 1-5 with a door closed to restrict access to an archwire slot, looking toward its mesial side.
Figure 6B:
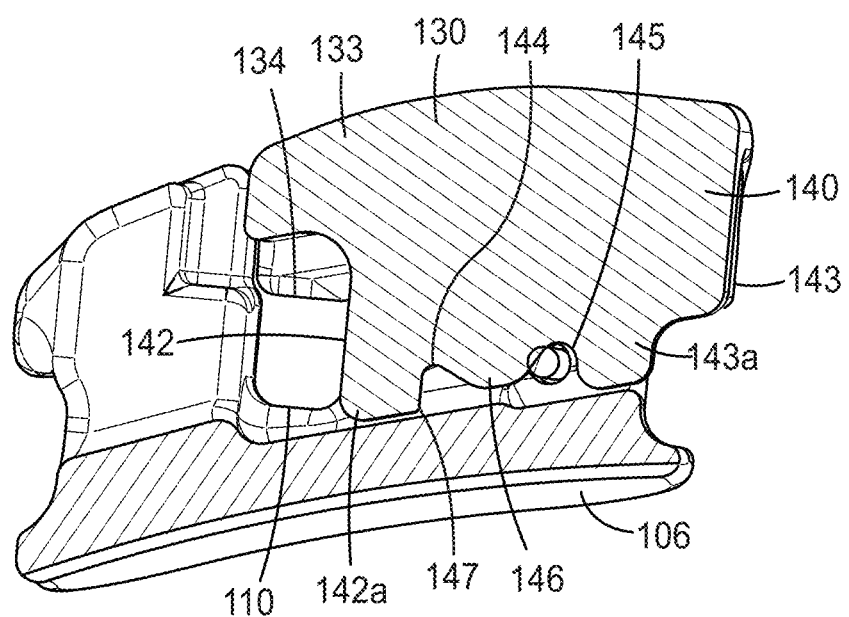
FIG. 6B is a cross-sectional view of the appliance of FIGS. 1-5 with a door open to allow access to an archwire slot, looking toward its mesial side

As further shown in FIGS. 6A, 6B and 9, the lingual portion of the strut 140 includes a pair of generally concave depressions 144, 145 spaced apart from each other along the direction of travel of the door 140 between the gingival leading edge 142 and the occlusal trailing edge 143. A protrusion 146 is disposed between the depressions 144, 145 and extends outwardly in a generally lingual direction. The protrusion 146 and projecting wall sections 142a, 143a cooperate to hold the beam 160 captive within the depressions 144, 145 and prevent the door 110 from becoming dislodged from the body 104. Unless the door 110 is being actively opened or closed, the beam 160 generally assumes one of the two positions defined by the depressions 144, 145, corresponding to the open and closed positions of the door 110, respectively. The door 140 can be reversibly opened and closed, as shown in FIGS. 6A and 6B, by sliding the protrusion 146 back and forth between regions on the occlusal and gingival sides of the deflectable beam 160.

Upon initial assembly and when sufficient force is applied to the door 130 in a generally gingival direction, the protrusion edge projection 142a presses against the beam 160, causing it to deflect downwards (i.e. in a lingual direction) and permit the strut 140 to proceed further into the channel 140. In this position, the beam 160 is disposed in the gingival depression 144 and protrusion 146 is disposed on an occlusal side of the beam 160 (See FIG. 6A). Here, the beam 160 is constrained in an equilibrium position between the leading edge projection 142a and the protrusion 146. The appliance 100 is now in assembled form, with the door 130 in its opened position.

The leading edge projection 142a acts as a positive stop surface, preventing occlusal movement and disassembly of the door 130 without sufficient, desired force. The occlusal surface 147 of leading edge projection 142a can include convex curvature relative to the beam 160, including compound convex curvature in certain preferred embodiments. In implementations with compound curvature, the convex occlusal surface 147 may present a continuously curved surface or may include a flat land area adjacent a mesial-distal center. In such implementations, the mesial and distal edges of the occlusal surface 147 will typically include a greater radius of curvature relative to other areas of the occlusal surface 147. When the door 130 is open, the occlusal surface 147 will be disposed directly adjacent the gingival surface of the beam 160. The presence of curvature on this surface 147 can serve to dissipate forces from the beam 160 on edge projection 142a in the event the door is pulled in an occlusal direction. Transfer of force across the curved occlusal surface 147 can prevent the leading edge projection 142a from fracturing and substantially disrupting operation of the door and consequently the patient's treatment.

From this configuration, additional force can be applied to the door 130 in a gingival direction to close the door 130 and limit facial access to the archwire slot 108. Upon reaching a threshold amount of force, the beam 160 can resiliently deflect to allow passage of the protrusion 146 into a second position. In this position, beam 160 is disposed below the occlusal depression 145 and the protrusion 146 is located on the gingival side of the beam 160 (See FIG. 6B). Here, the beam 160 can be constrained in a second equilibrium position between the protrusion 146 and the trailing edge projection 143a. With the protrusion 146 gingival to the beam 160, the door 410 is closed. The beam 160 can deflect back toward its original orientation in the channel 120 to engage the occlusal depression 145 and prevent the door 130 from spontaneously opening. The trailing, occlusal edge projection 143a prevents further gingival movement of the door 130.

In some embodiments, the geometry of the protrusion 146 can also be tailored to adjust the forces required to open and close the door 130. For example, the opening and closing forces can be generally decreased by using a protrusion 146 having a generally trapezoidal profile (as viewed from the mesial or distal direction) and having a suitable side wall angle. In some embodiments, the side wall angle is less than about 45 degrees, less than about 35 degrees, or less than about 30 degrees. Conversely, the opening and closing forces can be increased by using a side wall angle greater than about 45 degrees, greater than about 55 degrees, or greater than about 60 degrees. If desired, asymmetric opening and closing forces can be realized by using a trapezoidal protrusion 146 with substantially different side wall angles (i.e., $\gamma_1$ and $\gamma_2$ in FIG. 6A). For example, the leading (or gingival-facing) edge of the protrusion 146 could have a side wall angle $\gamma_1$ of 40 degrees, while the trailing (or occlusal-facing) edge of the protrusion 146 could have a side wall angle $\gamma_2$ of 60 degrees, relative to the base of the protrusion. Such a configuration allows threshold opening forces to be intentionally increased, preventing the door 130 from accidently opening during mastication.

Once again, the process of opening and closing the door 130 can be made reversible because of the resilient nature of the beam 160. As the treating professional imparts occlusal and gingival forces to open and close the door 130, the beam 160 is deflectable towards the bottom wall 122 of the channel 120, thereby allowing the protrusion 146 to toggle between residing on the gingival and occlusal sides of the beam 160, respectively.

The forces of opening and closing the doors are determined by, inter alia, the material properties, protrusion dimensions and the cross-sectional dimensions of the beam 160. In presently preferred implementations, the beam 160 is a wire segment of a superelastic nickel-titanium alloy. In one exemplary embodiment, the beam 160 has a circular cross-sectional configuration with a diameter of 0.18 millimeters (0.007 inches). Other embodiments can feature a beam with a diameter of at least 0.13 millimeters (0.005 inches) and no greater than 0.38 millimeters (0.015 inches). The protrusion 146 can have a height of 0.20 millimeters (0.008 inches) and an area of 0.356 millimeters×0.25 millimeters (0.014 inches×0.010 inches). The interference (e.g., overlap) between top of beam 160 and bottom of protrusion 146 is typically at least 0.127 millimeters (0.0005 inches) and typically no greater than 0.381 millimeters (0.015 inches) when the appliance 100 is assembled and not in transition, with the interference providing further assurance against accidental or otherwise undesired opening of the door 130. The clearance between other surfaces on the door 130 and the body 104 is on average about 19 micrometers (0.00075 inches) when both bodies are assembled.

When the door 130 is in its closed position, the archwire slot 108 is enclosed by four substantially rigid walls. Optionally, the slot 108 has an occlusal wall that is collectively defined by both a partial occlusal wall 111 located on the body 104 and a partial bottom wall surface corresponding to gingival leading edge 142 on the strut 140. The partial occlusal walls 112 extend along mesial and distal portions of the slot 108, and straddle the partial wall surface defined by the leading edge 142, which extends along a central portion of the slot 108 when the door is in the closed position. In this particular embodiment, the slot 108 has a facial wall defined exclusively by the contacting surfaces 134 of the door 130 and a gingival wall 111 exclusively defined by the body 104.

One benefit of the configuration described above is the lengthened interface between the rails and respective grooves. By increasing the occlusal-gingival length along which these mating surfaces engage each other, this configuration enhances stability, and reduces wobbling, of the door 130 as it slides open and closed along the body 104. This is especially useful where the appliance 100 is made as small as possible for patient comfort and space on the body 104 is limited.

In exemplary embodiments, some or all of the base 102, body 104, and door 110 are made from a translucent ceramic material. Particularly preferred ceramic materials include the fine-grain polycrystalline alumina materials described in issued U.S. Pat. No. 6,648,638 (Castro, et al.). These ceramic materials are known for their high strength and also provide superior aesthetics compared with metallic materials because they transmit light and can visually blend in with the color of the underlying tooth surface. In other embodiments, the base 102 and body 104 may be integrally made, for example, via machine or mold from a polymeric material as disclosed in U.S. Pat. No. 4,536,154 (Garton, et al.), or a polymer-ceramic composite such as glass-fiber reinforced polymeric composites as disclosed in U.S. Pat. No. 5,078,596 (Carberry, et al.) and U.S. Pat. No. 5,254,002 (Reher, et al.). Other suitable materials include, for example, metallic materials (such as stainless steel, titanium, and cobalt-chromium alloys) and plastic materials (such as fiber-reinforced polycarbonate), and combinations thereof. As an example, an appliance can include a base 102 and body 104 made from ceramic material, and the door 110 made from a polymeric composite; other material iterations and combinations are other possible.

Figure 11A:
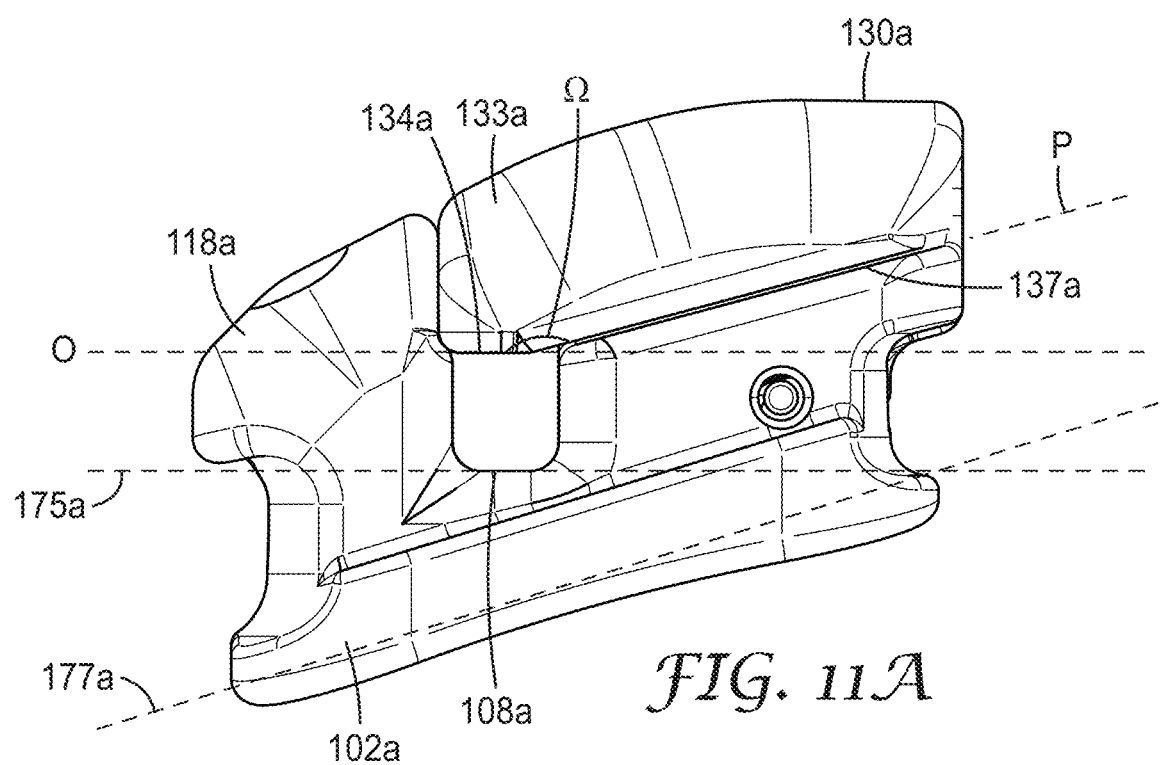
FIG. 11A is a side view of another appliance according to the present disclosure, looking toward its mesial side, with the door in the slot closed position.
Figure 11B:
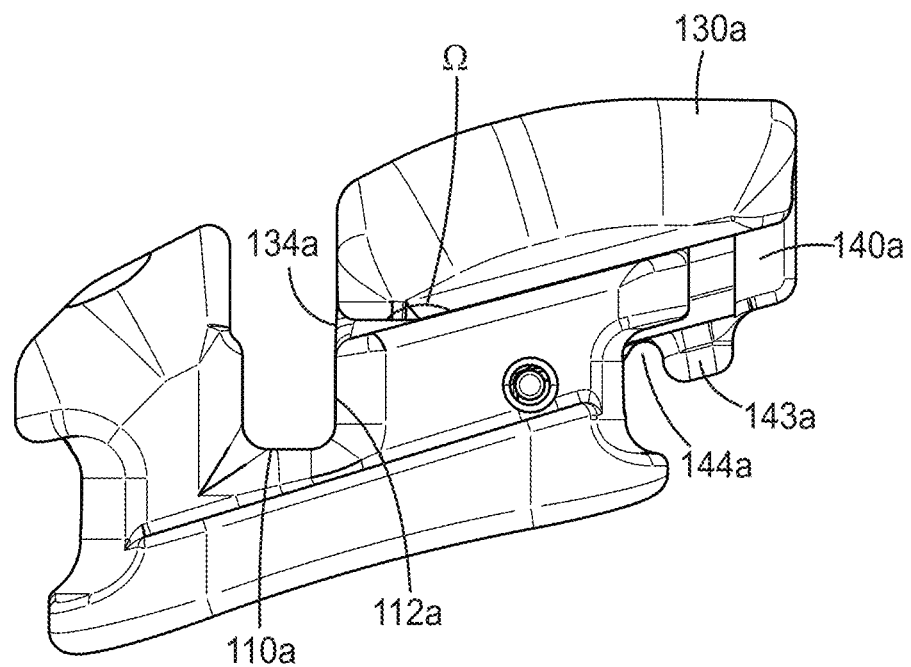
FIG. 11B is a side view of another appliance according to the present disclosure, looking toward its mesial side, with the door in the slot open position.

FIGS. 11A and 11B illustrate an appliance 100a according to another embodiment similar in many respects to those shown in FIGS. 1-10. The appliance 100a includes a glide surface 137a reference plane P that is oriented at a more severe upward angle (i.e., facial and occlusal) angle Ω relative to the bottom wall 110a of the archwire slot 108a and the plane O containing archwire contacting surfaces 134a. In some embodiments, the angle Ω formed between the glide surface plane P and the contacting surfaces plane O is at least about 120 degrees, at least about 130 degrees, or at least about 140 degrees. In some embodiments, the angle Ω formed between the planes O and P is up to about 165 degrees, up to about 155 degrees, or up to about 150 degrees. Appliance 100a accordingly has a reduced "in-out" dimension 170a between the base 102a and the bottom wall 110a of the archwire slot 108a. The resulting appliance possess a lower facial-lingual profile and is well suited for bonding to a patient's incisor tooth.

Figure 12A:
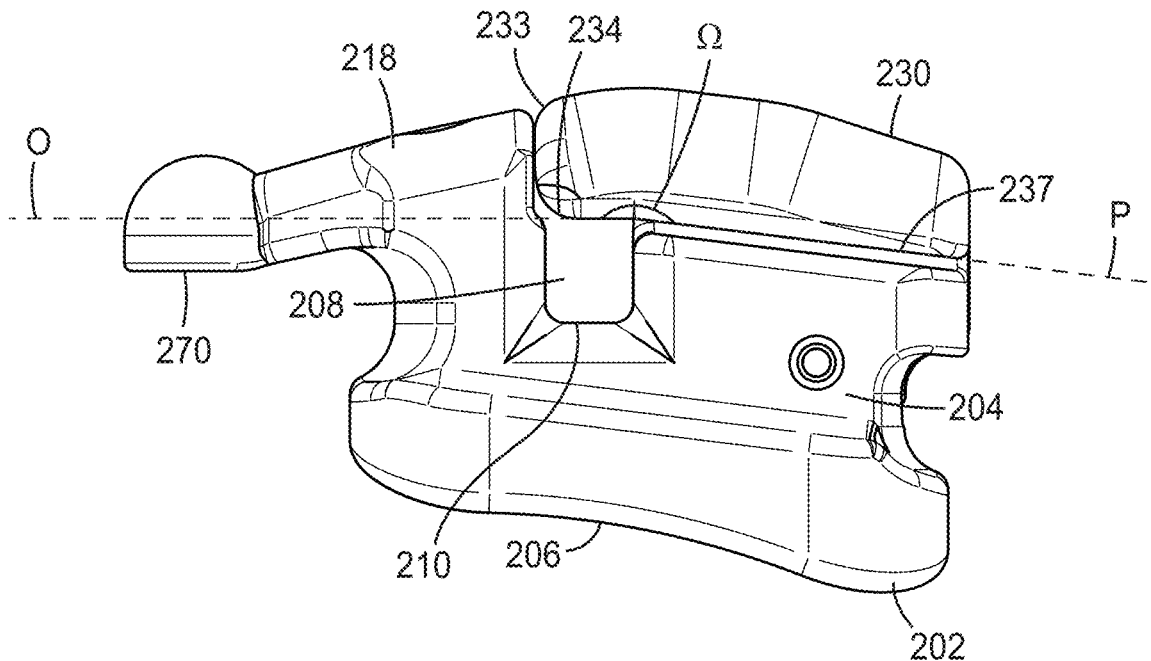
FIG. 12A is a side view of another appliance according to the present disclosure, looking toward its mesial side, with the door in the slot closed position.
Figure 12B:
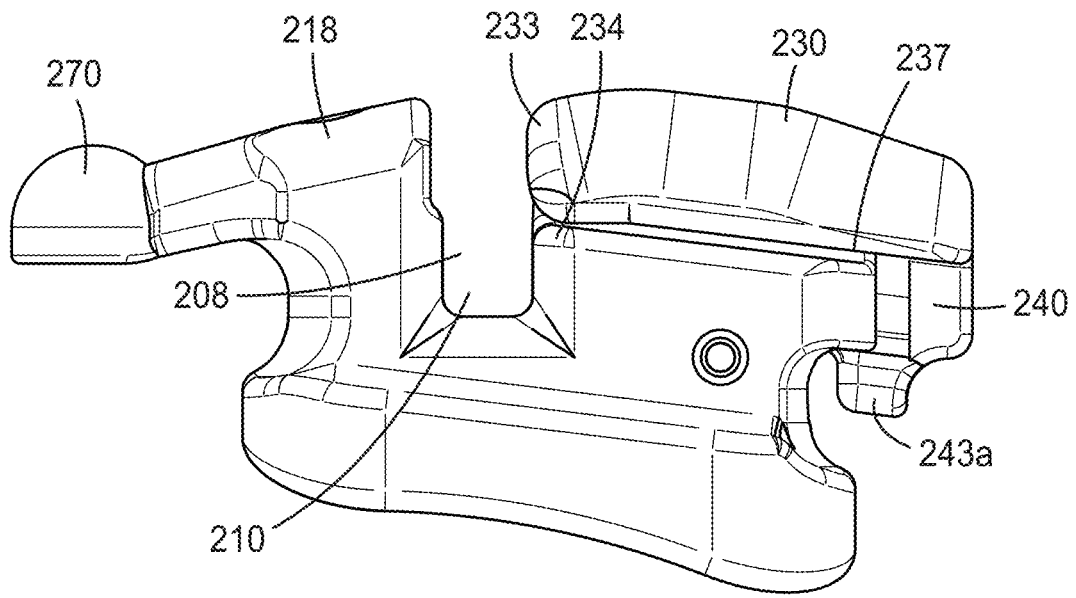
FIG. 12B is a side view of another appliance according to the present disclosure, looking toward its mesial side, with the door in the slot open position.
Figure 13:
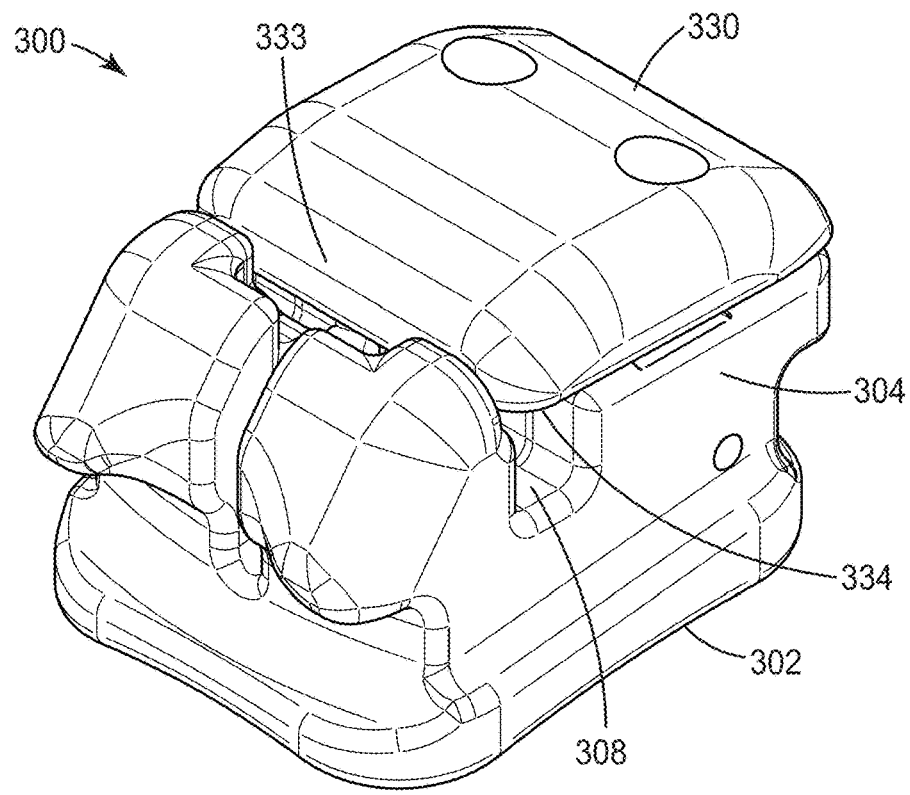
FIG. 13 is a perspective view of an orthodontic appliance according to one embodiment, looking toward its facial, gingival, and mesial sides.
Figure 14:
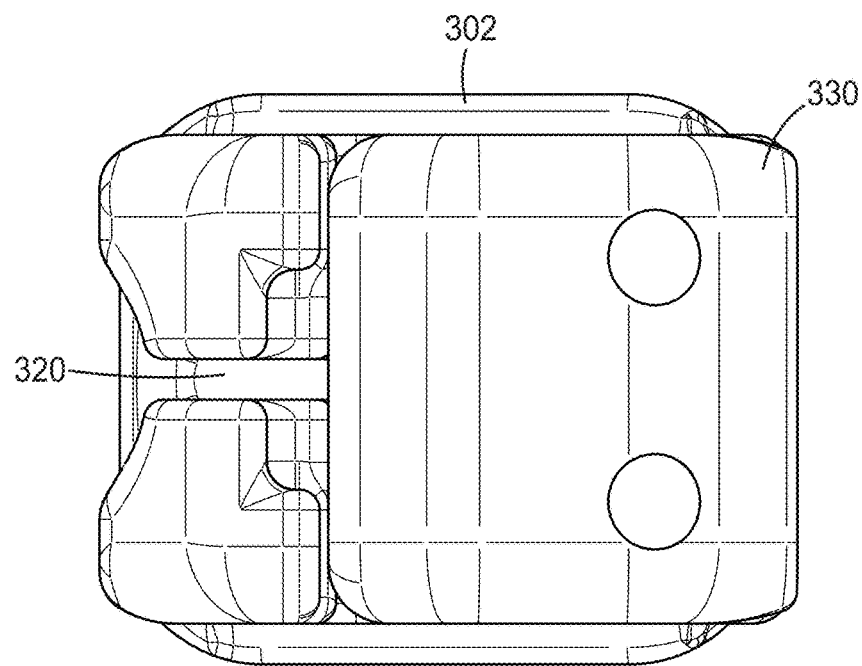
FIG. 14 is a plan view of the appliance of FIG. 13, looking toward its facial side.
Figure 15:
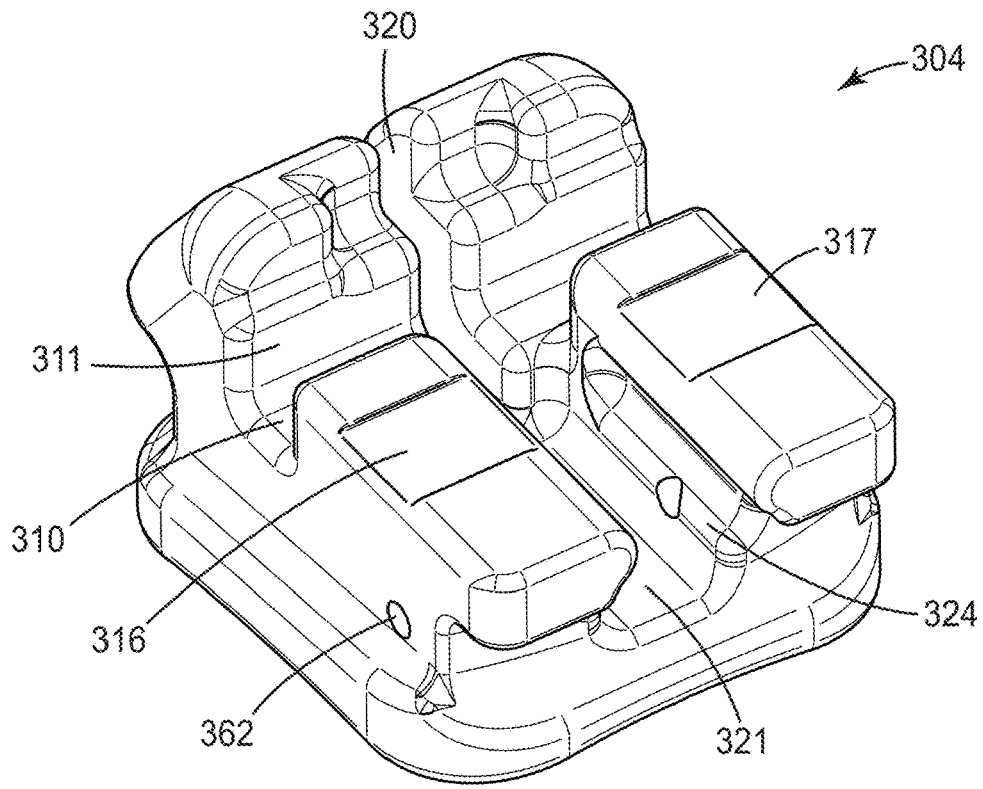
FIG. 15 is a side view of the appliance of FIGS. 1-3, looking toward its mesial side.
Figure 16:
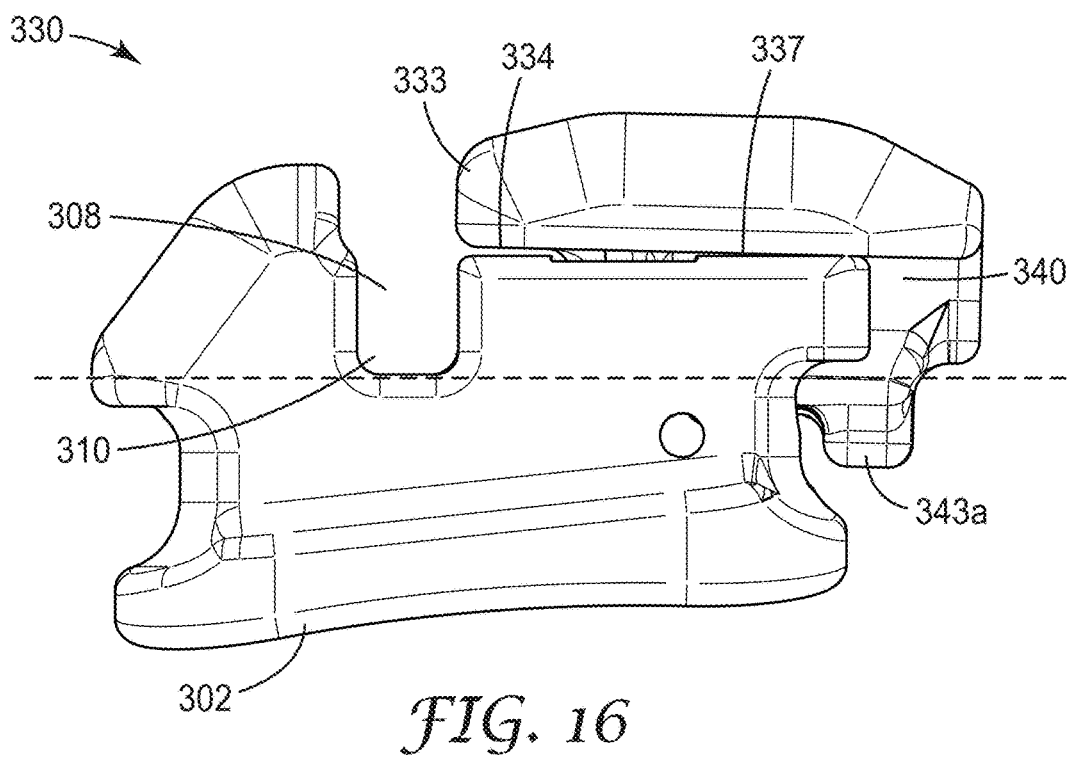
FIG. 16 is a perspective view of the appliance of FIGS. 1-5 with the door removed to expose hidden features of the appliance.
Figure 17:
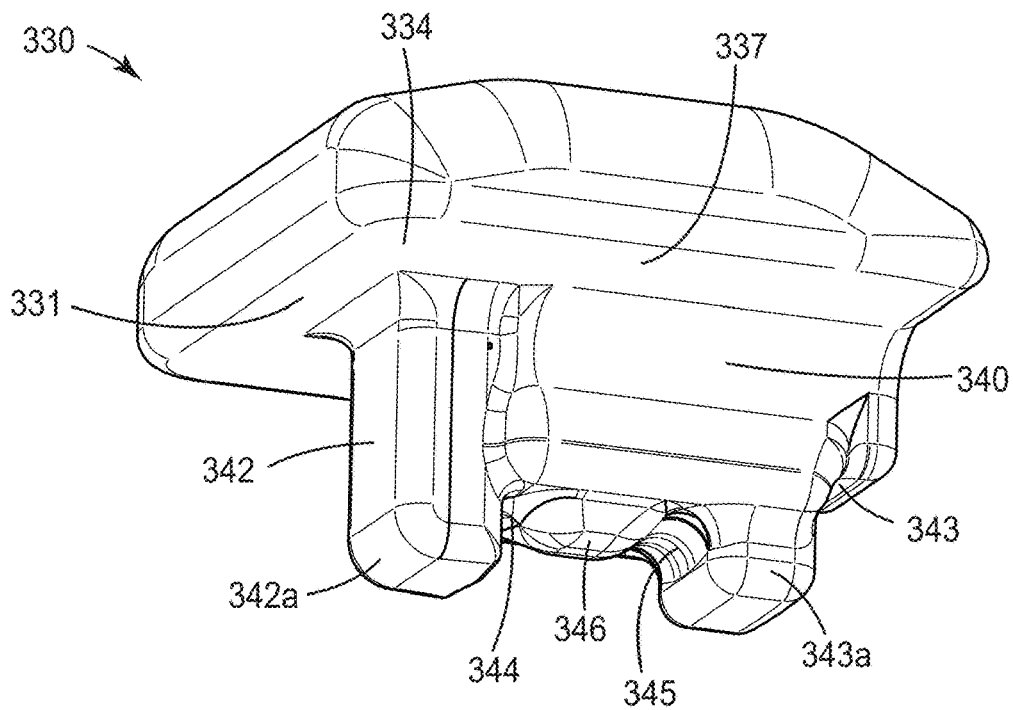
FIG. 17 is a perspective view of the door the appliance of FIGS. 13-15, looking toward its gingival, facial, and mesial sides.

FIGS. 12A and 12B illustrate an appliance 200 according to another embodiment similar in many respects to those shown in FIGS. 1-10 and 11A-B. The appliance 200 has a base 202, a body 204 extending from the base 202, and an archwire slot 208 extending across the body 204 in a generally mesial-distal direction. A hook 270 extends outward from the mesial tiewing 218. The appliance 200 further includes a door 230 that is slidably engaged to the body 204 and toggles between an open position where the slot 208 is accessible and a closed position where the slot 208 is not accessible from a facial direction.

Unlike appliances 100 and 100a, the archwire slot 208 includes a glide surface 237 reference plane P that is oriented at a downward (i.e., lingual and occlusal) angle Ω relative to the bottom wall 110 of the archwire slot 108 and the plane O containing archwire contacting surfaces 134. In some embodiments, the angle Ω formed between the glide surface plane P and the contacting surfaces plane O is at least about 181 degrees, at least about 183 degrees, or at least about 185 degrees. In some embodiments, the angle Ω formed between the planes O and P is up to about 210 degrees, up to about 200 degrees, or up to about 190 degrees. Appliance 200 is particularly suited for bonding to an upper bicuspid tooth.

It is to be understood that many other aspects of appliance 200 may have similar form and function to those described in appliances 100 and 100a and these need not be repeated.

FIGS. 13-17 illustrate an appliance 300 according to still another embodiment of the present disclosure. The appliance 300 has many of the same features as the appliances 100, 100a, and 200, including a base 302, body 304 with an archwire slot 308, and a door 330 slidably received in a channel 320. Unlike appliance 100 or 200, both the wire contacting surfaces 334 and glide surfaces 337 of the door 330 are parallel to the bottom wall 310 of the archwire slot 308.

The body 304 includes an occlusal-gingivally extending channel 320 includes recesses 323, 324. The facial surface 306 of the body, however, lacks rails, instead featuring mesial and distal guide surfaces 316, 317. As best demonstrated by FIG. 15, the guide surfaces 316, 317 are generally parallel to the bottom wall 310 of the archwire slot 308 and cooperate with the lingual surface 331 the operative sliding motion of the door 330. The corresponding door 330 lacks grooves, and accordingly includes a generally planar lingual surface 331. In an additional point of distinction from appliances 100 and 200, the archwire contacting surfaces 334 are coplanar with the glide surfaces 337. While appliance 300 may demonstrate a greater facial-lingual height than appliances 100, 100a, and 200, the reduced complexity of the body 304 and door 330 may ease molding or other methods of manufacturing the appliance.

It is to be understood that many other aspects of appliance 300 may have similar form and function to those described in appliances 100, 100a, and 200 and these need not be repeated.

Figure 18:
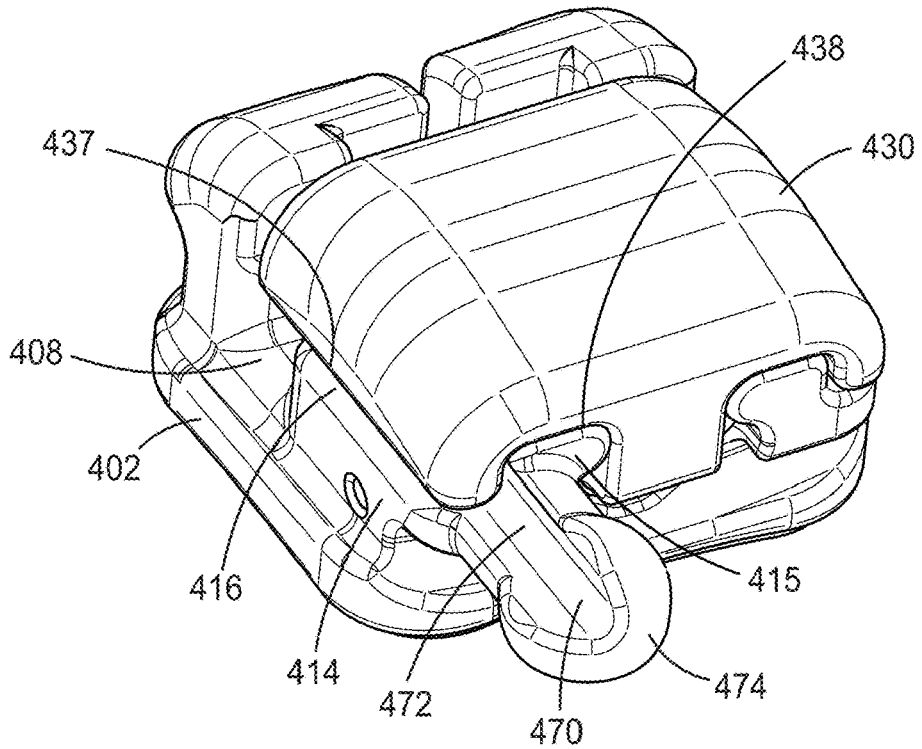
FIG. 18 is a perspective view of another orthodontic appliance according to one embodiment, looking toward its facial, occlusal, and mesial sides.

Turning to FIG. 18, another embodiment of the present disclosure is illustrated that is particularly suited for bonding to lower cuspid and biscuspid teeth. The appliance 400 has many of the same features as the appliances 100, 100a, 200, and 300 including a base 402, body 404 with an archwire slot 408, and a door 430 slidably received in a channel 420. Unlike appliance 200, the body 404 includes a hook 470 extending from door support section 414 in a gingival direction from the archwire slot 408. The hook 470 includes a groove 472 defined by surfaces extending from guide surface 416 and guiderail 415. The groove 472 allows the door 430 to travel along a portion of the hook 470 during transition between open and closed states. The groove 472 also allows the door 430 to be assembled over the spherical end 474 and body of the hook 470.

It is to be understood that many other aspects of appliance 400 may have similar form and function to those described in appliances 100, 100a, 200, 300 and these need not be repeated.

The appliance doors embodied above preferably have force characteristics that enable the treating professional to easily open and close the door using a common orthodontic hand instrument, such as an orthodontic explorer. Optionally, a specialized hand instrument could be used to limit the sliding motion of the door; for example, a flat probe could be inserted in the seam between the leading edge of the door and the body, and then twisted to open the door. This could help reduce the risk of accidental debonding. In presently preferred circumstances, the force required to open and close the door is sufficiently low to enable easy operation by a practitioner but also sufficiently high such that the door does not spontaneously disengage during normal patient activity that occurs during treatment, such as chewing and toothbrushing. Preferably, the threshold amount of force applied to open the door is at least about 0.45 newtons (0.1 lbf), at least about 0.9 newtons (0.2 lbf), at least about 2.2 newtons (0.5 lbf), or at least about 4.4 newtons (1 lbf). The threshold force can be up to about 25.8 newtons (5.8 lbf), up to about 11.6 newtons (2.5 lbf), or up to about 8.9 newtons (2 lbf).

Finite Element Analysis (FEA) can be used to examine the strength of the appliance when subjected to labial pull forces, defined as the force required to pull the door labially (e.g., opposite from the bottom wall of the slot) until failure. FEA can performed on the appliance configuration using ANSYS engineering simulation software (version 15, from ANSYS in Canonsburg, PA). For example, an appliance 100 was shown to withstand labial pull forces up to 15.4 lbf before high stress or failure occurred. The labial pull force was tested using a 0.021 inch by 0.021 inch square stainless steel wire segment.

Kits and assemblies of the appliance described are also contemplated herein. For example, one or more of the appliances described herein may be pre-coated with a suitable orthodontic adhesive and packaged in a container or a series of containers, as described for example in U.S. Pat. No. 4,978,007 (Jacobs et al.); U.S. Pat. No. 5,015,180 (Randklev); U.S. Pat. No. 5,429,229 (Chester et al.); and U.S. Pat. No. 6,183,249 (Brennan, et al.), and U.S. Patent Publication No. 2008/0286710 (Cinader et al.) As another option, any of these appliances could also be used in combination with a placement device allowing for indirect bonding to the patient, as described in U.S. Pat. No. 7,137,812 (Cleary, et al.).

As a further option, any of the above appliances may include an archwire slot that has opposing sidewalls that are tapered to enhance torque strength, as described in International Publication No. WO2013/055529 (Yick et al.).

Embodiments

1. An orthodontic appliance comprising
 a base having a bonding surface,
 a body extending outwardly from the base, the body including an mesial-distally extending arch wire slot having a bottom wall,
 a door slidably coupled to the body, the door moveable between an open state in which an archwire can be ligated in the archwire slot and a closed state in which an archwire can be retained in the archwire slot, wherein the door has a lingual surface including coplanar mesial and distal surfaces, and wherein the bottom wall forms an acute angle with the mesial and distal surfaces, and wherein the lingual surface includes a leading edge region that includes planar contacting surfaces that are substantially parallel to the bottom wall.

2. An orthodontic appliance of embodiment 1 and further comprising a channel in the body oriented generally perpendicular to the slot, and wherein the door includes a strut extending from a lingual surface, wherein the strut is slidably received in the channel.

3. An orthodontic appliance according to embodiment 2, wherein the channel further comprising a latch oriented generally perpendicular to the sliding direction of the door.

4. The orthodontic appliance of embodiment 3, wherein the latch comprises a beam extending in a mesial-distal direction across the channel and offset from the bottom of the channel.

5. The orthodontic appliance of embodiment 4, wherein the beam is deflectable in directions toward the bottom of the channel to allow the door to transition between the open state and the closed state.

6. An orthodontic appliance according to embodiment 3, wherein the strut includes at least one rail extending along a mesial or distal side of the leg, and wherein the channel includes at least one recess, and wherein the rail is slidably engaged in the recess.

7. The orthodontic appliance of any of the prior embodiments, wherein the lingual surface of the door includes a least one groove extending through at least a portion of the occlusal-gingival height of the door such that, in the closed state, a portion of the groove is positioned over the bottom wall.

8. The orthodontic appliance of embodiment 7, wherein the lingual surface includes two grooves on opposing sides of the strut.

9. The orthodontic appliance of any of the prior embodiments, wherein the body further comprises one or more guiderails on the facial surface.

10. The orthodontic appliance of embodiment 9, wherein each guiderail is received in a groove on the lingual surface of the door.

11. An orthodontic appliance comprising:
 a base having a bonding surface,
 a body extending outwardly from the base, the body including an mesial-distally extending arch wire slot having a bottom wall and a channel in the body oriented generally perpendicular to the slot,
 a door slidably coupled to the body, the door moveable between an open state in which an archwire can be ligated in the archwire slot and a closed state in which an archwire can be retained in the archwire slot, wherein the lingual surface of the door includes a leading edge region having a contact surface substantially parallel to the bottom wall in the closed state and a strut extending from a mesial-distal center of the lingual surface that is slidably received in the channel.

12. The orthodontic appliance of embodiment 11, wherein the body further includes first and second guiderails disposed along opposing sides of the channel.

13. The orthodontic appliance of embodiment 12, wherein the lingual surface of the door includes first and second grooves extending through at least a portion of the occlusal-gingival height of the door, and wherein the first guiderails is received in the first groove and the second guiderail is received in the second groove.

14. The orthodontic appliance of embodiment 13, wherein the first and second grooves are disposed on opposing sides of the strut.

15. The orthodontic appliance of any of the prior embodiments, wherein the body channel further comprising a latch oriented generally perpendicular to the sliding direction of the door.

16. The orthodontic appliance of embodiment 15, wherein the lock impedes movement of the door in directions away from the archwire slot.

17. The orthodontic appliance of embodiment 16, wherein the latch comprises a beam extending in a mesial-distal direction across the channel.

18. The orthodontic appliance of embodiment 17, wherein the beam is deflectable in directions toward the bottom of the channel to allow the door to transition between the open state and the closed state.

19. The orthodontic appliance of embodiments 11-13, wherein the strut includes at least one rail extending along a side thereof, and wherein the rail is received in a recess in communication with the body channel.

20. The orthodontic appliance of any of the prior embodiments, wherein the leading edge region includes a pair of coplanar contacting surfaces that, when the door is closed, are positioned on opposing mesial and distal ends of the archwire slot.

21. The orthodontic appliance of embodiment 20, wherein the height of the archwire slot, when the door is closed, is reduced at the mesial and distal ends compared to regions of the slot adjacent the mesial-distal center.

22. The orthodontic appliance of embodiment 20, wherein the door includes a mesial glide region extending in a mesial direction from the first channel and a distal glide region extending in a distal direction from the second channel, the mesial and distal glide regions sliding along the body and being generally coplanar.

23. The orthodontic appliance of embodiment 22, wherein the glide regions are oriented at an oblique angle relative to the contacting surfaces.

24. A method of ligating an archwire, the method comprising:

providing an appliance with a base having a bonding surface, a body extending outwardly from the base, the body including an mesial-distally extending arch wire slot having a bottom wall, and a door slidably coupled to a channel in the body, the door moveable between an open state in which an archwire can be ligated in the archwire slot and a closed state in which an archwire can be retained in the archwire slot; and sliding the door in the direction of the archwire slot, wherein sliding the door in the direction of the archwire slot deflects a latch extending across the channel in a lingual direction.

25. The method of embodiment 24, wherein the door includes a strut having a protrusion and a pair grooves on either side of the strut, and wherein sliding the door results in the protrusion causing the deflection of the latch.

All of the patents and patent applications mentioned above are hereby expressly incorporated into the present description. The foregoing invention has been described in some detail by way of illustration and example for purposes of clarity and understanding. However, various alternatives, modifications, and equivalents may be used and the above description should not be taken as limiting in the scope of the invention which is defined by the following claims and their equivalents.

What is claimed is:

1. An orthodontic appliance comprising:
a base having a bonding surface,
a body extending outwardly from the base, the body including a mesial-distally extending archwire slot having a bottom wall and a channel oriented perpendicular to the archwire slot, the channel including a latch oriented parallel to the archwire slot,
a door slidably coupled to the body, the door moveable between an open state in which an archwire can be ligated in the archwire slot and a closed state in which the archwire can be retained in the archwire slot, wherein the door has a facial surface and a lingual surface including coplanar mesial and distal regions, and wherein the bottom wall forms an acute angle with the mesial and distal regions, wherein the lingual surface includes a leading edge region that includes planar contacting surfaces that are substantially parallel to the bottom wall, wherein the lingual surface includes a strut projecting therefrom between the mesial and distal regions and at least one occlusal-gingivally extending groove arranged in mesial or distal region, and wherein a mesial-distal width of the strut is smaller than a mesial distal width of the facial surface.

2. An orthodontic appliance of claim 1, wherein the strut is slidably received in the channel.

3. An orthodontic appliance according to claim 2, wherein the latch is oriented perpendicular to the sliding direction of the door.

4. The orthodontic appliance of claim 3, wherein the latch comprises a beam extending in a mesial-distal direction across the channel and offset from the bottom of the channel, and wherein the beam is deflectable in directions toward the bottom of the channel to allow the door to transition between the open state and the closed state.

5. An orthodontic appliance according to claim 1, wherein the strut comprises a leg includes at least one rail extending along a mesial or distal side of the leg, and wherein the channel includes at least one recess, and wherein the rail is slidably engaged in the recess.

6. The orthodontic appliance of claim 1, wherein the at least one occlusal-gingivally extending groove includes two grooves, a first groove and a second groove, each on opposing sides of the base of the strut and extending through at least a portion of the occlusal-gingival height of the door such that, in the closed state, a portion of the occlusal-gingivally extending groove is positioned over the bottom wall.

7. The orthodontic appliance of claim 1, wherein the body further comprises a first guiderail and a second guiderail on a facial surface of the body.

8. The orthodontic appliance of claim 7, wherein the at least one occlusal-gingivally extending groove on the lingual surface of the door includes two grooves, a first groove and a second groove, and wherein the first guiderail is received in the first groove and the second guidrail is received in the second groove.

9. The orthodontic appliance of claim 8, wherein sliding the door in a direction away from the archwire slot results in the latch traveling from the first groove to the second groove.

10. The orthodontic appliance of claim 1, wherein the strut has a protrusion and a pair of grooves including a first groove and second groove, one on either side of the protrusion, and wherein sliding the door results in the protrusion causing the deflection of the latch.

11. The orthodontic appliance of claim 1, wherein a depth of the channel is greater than a depth of the archwire slot.

12. The orthodontic appliance of claim 1, wherein the channel bisects the body.

13. The orthodontic appliance of claim 1, wherein the strut comprises a leg and includes a first rail extending along a mesial side of the leg and a second rail extending along a distal side of the leg, and wherein the channel includes a mesial recess and a distal recess on the respective sides of the channel, and wherein the mesial rail is slidably engaged in the mesial recess and the distal rail is slidably engaged in the distal recess.

14. The orthodontic appliance of claim 1, wherein the channel has a channel bottom nearer the bonding surface than is the bottom wall of the archwire slot.

15. A method of ligating an archwire, the method comprising:
providing an appliance with a base having a bonding surface, a body extending outwardly from the base, the body including a mesial-distally extending arch wire slot having a bottom wall, and a door slidably coupled to a channel in the body, the door moveable between an open state in which an archwire can be ligated in the archwire slot and a closed state in which an archwire can be retained in the archwire slot;
wherein the body further comprises a first guiderail and a second guiderail on a facial surface of the body, and a lingual surface of the door includes a first occlusal-gingivally extending groove and a second occlusal-gingivally extending groove, and wherein the first guiderail is received in the first occlusal-gingivally extending groove and the second guiderail is received in the second occlusal gingivally extending groove,
sliding the door in the direction of the archwire slot, wherein sliding the door in the direction of the archwire slot deflects a latch extending across the channel in a lingual direction, the channel having a channel bottom nearer the bonding surface than is the bottom wall of the archwire slot.

16. The method of claim 15, wherein the door includes a strut having a protrusion and a pair of grooves on either side of the protrusion, and wherein sliding the door results in the protrusion causing the deflection of the latch.

17. The method of claim 15, wherein the strut has a protrusion and a pair of grooves including a first groove and second groove, one on either side of the protrusion, and wherein sliding the door results in the protrusion causing the deflection of the latch.

18. The method of claim 17, wherein sliding the door in a direction away from the archwire slot results in the latch traveling from the first groove to the second groove.

* * * * *